United States Patent
Makino et al.

[11] Patent Number: 6,040,891
[45] Date of Patent: Mar. 21, 2000

[54] PHOTOGRAPHIC PRINTING APPARATUS

[75] Inventors: Masanori Makino; Hirotake Mochizuki; Takao Misawa; Takao Tsuda, all of Hino, Japan

[73] Assignee: Konica Corporation, Tokyo, Japan

[21] Appl. No.: 09/075,864

[22] Filed: May 12, 1998

[30] Foreign Application Priority Data

| May 14, 1997 | [JP] | Japan | 9-124037 |
| May 16, 1997 | [JP] | Japan | 9-126873 |
| Jun. 6, 1997 | [JP] | Japan | 9-149283 |

[51] Int. Cl.[7] .................. G03B 27/52; G03B 27/62
[52] U.S. Cl. ........................... 355/46; 355/75
[58] Field of Search .................. 355/40, 41, 46, 355/75, 27, 76; 396/568, 570, 616

[56] References Cited

U.S. PATENT DOCUMENTS

| 3,699,869 | 10/1972 | Jensen | 396/616 |
| 5,311,232 | 5/1994 | Deck et al. | 396/568 |
| 5,452,050 | 9/1995 | Ishikawa et al. | 355/27 |

*Primary Examiner*—Alan A. Mathews
*Attorney, Agent, or Firm*—Finnegan, Henderson, Farabow, Garrett & Dunner, L.L.P.

[57] ABSTRACT

An image recording apparatus comprising: a film loading section in which a first film and a second film having a width which differs from that of the first film can be loaded; a detecting means which detects a film width and outputs detection signals; a conveyance means for conveying said films; a conveyance control means which controls said conveyance means in accordance with said detection signals; and a light source which irradiates the first film or the second film conveyed by said conveyance means and thereby projects light corresponding to an image formed on the first film or the second film on a light-sensitive material.

32 Claims, 18 Drawing Sheets

6,040,891

PHOTOGRAPHIC PRINTING APPARATUS

BACKGROUND OF THE INVENTION

The present invention relates to a photographic printing apparatus capable of conducting printing exposure of images on photographic films of plural types each being different from others in terms of width.

Heretofore, in a photographic printing apparatus capable of conducting printing exposure of an image on a photographic film having a first width and of conducting printing exposure of an image on a photographic film having a second width, which is different from the first width, a film carrier having a lane for passing the photographic film having the first width through and a film carrier having a lane for passing the photographic film having the second width through have been used by switching them depending on a width of the photographic film to be subjected to printing exposure. For example, in the photographic printing apparatus, which is capable of conducting printing exposure of an image on a 135 type film and is also capable of conducting printing exposure of an image on an IX 240 type film (different from the 135 type film in terms of width), a film carrier having a lane for passing the photographic film having the first width through and a film carrier having a lane for passing the photographic film having the second width through have been used by switching them depending on a width of the photographic film to be subjected to printing exposure.

In the case of using a film carrier having a lane, which passes a 135 type film there through, and a film carrier having a lane, which passes an IX 240 type film through by switching them depending on a width of a photographic film to be subjected to printing exposure, frequent replacement of the film carrier is required when the number of prints from the IX 240 type film increases, which results in poor operability, though it is not so problematic when the number of prints from the 135 type film is overwhelming.

Further, when a carrier is set to the prescribed position on the printing apparatus main body, the height of a focusing plane from the reference position for film setting on the carrier needs to be strict, and therefore, dispersion in plural carriers is required to be in the extremely narrow range, which has compelled hardships in securing accuracy for processing, assembling and adjusting.

Film damage has been caused by an unskilled operator who inserted in a film carrier the film whose width is different from that of the film carrier.

It is double investment and is uneconomical to prepare and keep two types of film carriers separately for using them.

SUMMARY OF THE INVENTION

An object of the invention, therefore, is to make replacement of film carriers unnecessary and thereby to achieve improvement of work efficiency and further to improve economy, by providing a photographic printing apparatus wherein plural photographic films each being different from others in terms of width can be subjected to printing exposure by one image carrier.

The object of the invention stated above can be achieved by the following structures. An image recording apparatus having therein:

a film loading section capable of being loaded with a first film and a second film which is different from the first film in terms of width;

a detecting means which detects the film width and outputs detection signals;

a conveyance means which conveys the above-mentioned film;

a conveyance control means which controls the conveyance means in accordance with the detection signals; and a light source which irradiates the first or second film conveyed by the conveyance means and thereby projects light which corresponds to the image formed on the first or second film on a light-sensitive material.

The aforesaid object of the invention can further be attained by the structure in accordance with the preferable embodiment described afterwards in DETAILED DESCRIPTION OF THE PREFERRED EMBODIMENT.

Structure corresponding to Embodiment 1

Item 1—1

A photographic printing apparatus capable of conducting printing exposure from a photographic film with a first width and also from a photographic film with a second width that is different from the first width, wherein there is provided a film carrier having a first lane for passing a photographic film with the first width through and a second lane for passing a photographic film with the second width through, and the first lane and the second lane can be positioned at the prescribed printing position through switching thereof by moving the film carrier, and the photographic film in the lane located at the aforesaid printing position is conveyed through the conveyance control in accordance with the lane located at the aforesaid printing position.

An arrangement of frame images recorded on a photographic film varies depending on the photographic film width. However, the structure of the Item 1—1 makes the following to be possible because conveyance is made through the conveyance control according to the lane located at the aforesaid printing position. Namely, when the first lane is arranged at a printing position, the photographic film in the first lane is conveyed under the conveyance control that matches the photographic film with the first width, and when the second lane is arranged at a printing position, the photographic film in the second lane is conveyed under the conveyance control that matches the photographic film with the second width, whereby it is possible to create automatically the conveyance control matching the photographic film to be printed.

Item 1-2

The photographic printing apparatus according to Item 1—1 wherein the photographic film is a photographic film on which plural frame images are arranged in the longitudinal direction, each of the first lane and the second lane has a mask that is positioned at the printing position when the lane is arranged at the printing position, and the conveyance control according to the lane arranged at the printing position includes the frame advancing control which positions each frame image at the mask successively by conveying the photographic film in accordance with the lane arranged at the printing position.

An arrangement of frame images recorded on a photographic film varies depending on the photographic film width. However, the structure of the Item 1-2 makes the following to be possible because the frame image is positioned at the mask in succession under the frame advancing control in accordance with the lane arranged at the printing position. Namely, when the first lane is arranged at a printing position, a frame image of the photographic film in the first lane is positioned successively at the mask under the frame advancing control that matches the photographic film with the first width, and when the second lane is arranged at a printing position, a frame image of the photographic film in the second lane is positioned successively at the mask under the frame advancing control that matches the photographic film with the second width, whereby it is possible to create automatically the frame advancing control matching the photographic film to be printed.

Item 1-3

The photographic printing apparatus according to Item 1-2 wherein the photographic film having the first width is a 135 type film and the photographic film having the second width is an IX 240 type film.

An arrangement of frame images recorded on a 135 type film mostly satisfies the prescribed law and an arrangement of frame images recorded on an IX 240 type film is one which is within a range of standards. Therefore, due to the structure of Item 1-3, an effect of creating the frame advancing control matching the photographic film to be printed is remarkable, and the creating of the frame advancing control matching the photographic film to be printed can be created automatically, whereby operability can sharply be improved.

Item 1-4

The photographic printing apparatus according to Item 1-3 wherein the frame advancing control in accordance with the lane arranged at the aforesaid printing position detects a frame image of the photographic film when the first lane is arranged at the printing position, then conveys the photographic film based on the position of the frame image detected, and positions the frame image at the mask successively, and conveys the photographic film based on its perforation when the second lane is arranged at the printing position, and positions the frame image at the mask successively.

An arrangement of frame images recorded on a 135 type film mostly satisfies the prescribed law, but some are not satisfied occasionally. Since an arrangement of frame images recorded on an IX 240 type film is in the positional relation with perforation of the IX 240 type film within the prescribed range, the photographic film is conveyed by the structure of Item 1-4 based on the position of the detected frame image for the 135 type film, thus the frame image is successively positioned at the mask. Therefore, even in the case of the arrangement of frame images which does not satisfy the prescribed law, excellent frame advancing control can be created, and for the IX 240 type film, frame images are positioned successively at the mask by conveying the photographic film based on its perforation. Therefore, the frame advancing control is extremely excellent, and therefore, the excellent frame image advancing control can be made automatically for both of the 135 type film and the IX 240 type film, due to automatic creation of the frame advancing control matching the photographic film to be printed, whereby operability can be improved sharply.

Item 1-5

The photographic printing apparatus according to Item 1-3 or Item 1-4 wherein there is provided a magnetic head which records or reads magnetic information of the IX 240 type film conveyed to the second lane, and the conveyance control in accordance with the lane arranged at the printing position includes the control to convey the photographic film with IX 240 standard so that magnetic information of the IX type film may be recorded or read when the second lane is arranged at the printing position.

Magnetic information is recorded with low magnetic force on the IX 240 type film, though no magnetic information is recorded on the 135 type film, and the magnetic information can neither be recorded nor be read unless the film is conveyed at excellent conveyance accuracy.

However, the structure of Item 1-5 makes the photographic film with the IX 240 standards to be conveyed so that magnetic information can be recorded or read from the IX 240 type film when the second lane is arranged at the printing position, whereby magnetic information can be recorded or read satisfactorily.

Item 1-6

The photographic printing apparatus according to either one of Item 1—1 through Item 1-5 wherein there is provided a lane detecting means which detects the lane arranged at the printing position, and the photographic film in the lane arranged at the printing position detected by the aforesaid lane detecting means is conveyed under the conveyance control according to the lane arranged at the printing position which is detected by the lane detecting means.

Due to the structure of Item 1-6, the conveyance control matching the photographic film to be printed can automatically be created because the lane arranged at the printing position is detected, and the photographic film in a lane corresponding to the lane arranged at the detected printing position is conveyed under the conveyance control according to the lane arranged at the printing position that is detected by the lane detecting means.

Item 1-7

A photographic printing apparatus capable of conducting printing exposure from a photographic film with a first width and also capable of conducting printing exposure from a photographic film with a second width that is different from the first width, wherein there is provided a carrier having a first lane for passing a photographic film with the first width through and a carrier having a second lane for passing a photographic film with the second width through, and the first lane or the second lane can be positioned at the prescribed printing position through switching thereof by moving the film carrier, and a printing lens which conducts printing exposure from the photographic film in the lane arranged at the printing position to a light-sensitive material for the print is provided, and the printing magnification of the printing lens is determined in accordance with the lane arranged at the printing position.

Though the printing magnification of a printing lens conducting printing exposure from a photographic film on a light-sensitive material for print use varies depending on a width of the photographic film, the structure of the Item 1-7 makes it possible to easily conduct the printing exposure from a photographic film on a light-sensitive material for print use by making the printing magnification of the printing lens to be appropriate, because the printing magnification of the printing lens is determined in accordance with the lane arranged at the printing position.

Item 1-8

The photographic printing apparatus according to Item 1-7, wherein the printing magnification of the printing lens is determined based on the lane arranged at the printing position and on the print size.

The structure of the Item 1-8 makes it possible to easily conduct the printing exposure from a photographic film on a light-sensitive material for print use by determining the printing magnification of the printing lens based on the lane arranged at the printing position and on the print size, because the lane arranged at the printing position tells a size of the frame image on the photographic film.

Item 1-9

The photographic printing apparatus according to Item 1-8, wherein the printing lens stated above is one to conduct printing exposure from a photographic film in the lane arranged in the printing position on a light-sensitive material for print use placed at the printing position, and the printing magnification of the printing lens is determined based on a size of the light-sensitive material for print use placed at the printing position.

The structure of the Item 1-9 makes it possible to easily obtain a marginless print with no trimming which complies with prescribed setting, a marginless print with trimming, a marginate print with no trimming which has a margin of the prescribed rate, and a marginate print with trimming which has a margin of the prescribed rate.

Item 1-10

The photographic printing apparatus according to either one of Item 1-7 through Item 1-9, wherein a lane detecting means which detects the lane arranged at the printing position is provided, and the printing magnification of the printing lens is determined based on the lane arranged at the printing position detected by the lane detecting means for the photographic film in the lane arranged at the printing position detected by the lane detecting means.

The structure of the Item 1-10 makes it possible to easily conduct the printing exposure from a photographic film onto a light-sensitive material for print use by making the printing magnification of the printing lens to be appropriate, because the lane arranged at the printing position is detected and the printing magnification of the printing lens is determined in accordance with the lane arranged at the detected printing position.

Item 1-11

The photographic printing apparatus according to either one of Item 1-7 through Item 1-10, wherein the printing magnification of the printing lens is made to be the printing magnification determined automatically.

The structure of the Item 1-11 makes it possible to conduct printing exposure automatically from a photographic film onto a light-sensitive material for print use, by the printing magnification of the printing lens to be the appropriate printing magnification.

Item 1-12

A photographic printing apparatus capable of conducting printing exposure from a photographic film with a first width and also from a photographic film with a second width that is different from the first width, wherein there is provided a film carrier having a first lane for passing a photographic film with the first width through and a second lane for passing a photographic film with the second width through, and the first lane and the second lane can be positioned at the prescribed printing position through switching thereof by moving the film carrier, and a size of a light-sensitive material for print use subjected to printing exposure from the photographic film in the lane arranged at the printing position is set in accordance with the lane arranged at the printing position.

Though the size of a light-sensitive material for print use which is subjected to printing exposure from a photographic film varies depending upon the width of the photographic film, the structure of Item 1-12 determines the size of the light-sensitive material for print use which is subjected to printing exposure from the photographic film in the lane arranged at the printing position based on the lane arranged at the printing position, which makes it possible to conduct easily printing exposure on a light-sensitive material for print use having an appropriate size.

Item 1-13

A photographic printing apparatus capable of conducting printing exposure onto a light-sensitive material for print use located at the printing position from a photographic film with a first width and also from a photographic film with a second width that is different from the first width, wherein there is provided a film carrier having a first lane for passing a photographic film with the first width through and a carrier having a second lane for passing a photographic film with the second width through, and the first lane and the second lane can be positioned at the prescribed printing position through switching thereof by moving the film carrier, and the initially set size of a light-sensitive material for print use subjected to printing exposure from a photographic film in the lane arranged at the printing position when the lane is switched is made to be the size of the light-sensitive material for print use determined in the preceding step in the lane arranged at the printing position.

In the structure of Item 1-13, the initial setting is made to the size of a light-sensitive material for print use which is most probable to be an appropriate size of the light-sensitive material for print use when a lane is switched, which makes it possible to conduct printing exposure efficiently.

Item 1-14

The photographic printing apparatus according to Item 1-13, wherein an indicating means which indicates the size of a light-sensitive material for print use set initially when a lane is switched and an inputting means which inputs the size of the light-sensitive material for print use are provided, and the size of the light-sensitive material for print use set initially is changed to the size of the light-sensitive material for print use inputted by the inputting means when the size of the light-sensitive material for print use is inputted by the inputting means.

In the structure of Item 1-14, the initial setting is made to the size of a light-sensitive material for print use which is most probable to be an appropriate size of the lightsensitive material for print use when a lane is switched, and the size of the light-sensitive material for print use can be changed immediately when it proves to be inappropriate, which makes it possible to conduct printing exposure efficiently.

Item 1-15

The photographic printing apparatus according to either one of Item 1-12 through Item 1-14, wherein an error is outputted when the established size of the light-sensitive material for print use proves to be the size for the light-sensitive material which can not be supplied to the printing position.

In the structure of Item 1-15, an error is outputted when the established size of the light-sensitive material for print use proves to be the size for the light-sensitive material which can not be supplied to the printing position, which makes it possible to take actions satisfactorily.

Item 1-16

A photographic printing apparatus capable of conducting printing exposure from a photographic film with a first width and also from a photographic film with a second width that is different from the first width, wherein there is provided a film carrier having a first lane for passing a photographic film with the first width through and a carrier having a second lane for passing a photographic film with the second width through, and the first lane and the second lane can be positioned at the prescribed printing position through switching thereof by moving the film carrier, each of the first lane and the second lane is provided with a reading sensor which detects information recorded on a photographic film, a switching means which switches so that detection signals of the reading sensor on the lane arranged at the printing position may be transmitted the reading means is provided, and a reading means which reads information recorded on the photographic film from the detection signals of the reading sensor which are to be transmitted by the switching means is provided.

In the structure of Item 1-16, even when the number of reading means reading information recorded on the photographic film from detection signals of the reading sensor is only one, no problem is caused by switching so that detection results of the reading sensor on the lane arranged at the printing position may be transmitted to the reading means, because it is not necessary that information recorded on the photographic film is read at the first lane and the second lane simultaneously, thus, cost of reading means can be reduced by using a reading means commonly for the first lane and the second lane.

Incidentally, the switching means may be either one which switches detection signals transmitted from the reading sensor to the reading means, or one which switches reading operations of the reading sensor. An example of the switching means to switch reading operations of the reading sensor includes one which switches ON and OFF for supplying electric power to the reading sensor, and when the reading sensor is represented by a photodetecting sensor, an example thereof includes one which switches ON and OFF of a light source for the photodetecting sensor.

Item 1-17

A photographic printing apparatus capable of conducting printing exposure from a photographic film with a first width and also from a photographic film with a second width that is different from the first width, wherein there is provided a film carrier having a first lane for passing a photographic film with the first width through and a carrier having a second lane for passing a photographic film with the second width through, and the first lane and the second lane can be positioned at the prescribed printing position through switching thereof by moving the film carrier, and there is provided a motor which drives to convey a photographic film in any of the first lane and the second lane.

In the structure of Item 1-17, even when one motor drives to convey a photographic film in each of the first and the second lanes, no problem is caused because it is not necessary that a photographic film in the first lane and that in the second lane are conveyed simultaneously, whereby cost of driving for conveyance can be reduced. In the case of conveying only a photographic film in the lane arranged at the printing position, in particular, an effect of the invention is conspicuous.

Item 1-18

A photographic printing apparatus capable of conducting printing exposure from a 135 type film and also from an IX 240 type film wherein there is provided a film carrier having a first lane for passing a photographic film with the first width through and a carrier having a second lane for passing a photographic film with the second width through, and the first lane and the second lane can be positioned at the prescribed printing position through switching thereof by moving the film carrier, and when the first lane is arranged at the printing position, the film carrier can be rotated around the printing position.

The 135 type film includes a photographic film wherein full-sized frame images are recorded and a photographic film wherein half-sized frame images are recorded. In the structure of Item 1-18, however, prints in the same direction and in the same size can be obtained simply from both frame images recorded to be half-sized and frame images recorded to be full-sized when the first lane to pass the 135 type film through is arranged at the printing position, because the film carrier can be rotated around the printing position.

Item 1-19

A photographic printing apparatus capable of conducting printing exposure from a photographic film with a first width and also from a photographic film with a second width that is different from the first width, wherein there is provided a film carrier having a first lane for passing a photographic film with the first width through and a second lane for passing a photographic film with the second width through, and the first lane and the second lane can be positioned at the prescribed printing position through switching thereof by moving the film carrier, and there is provided an erroneous insertion detecting means which detects that a photographic film with a wrong width is inserted when a photographic film with a wrong width is inserted at least in the lane arranged at the printing position.

In the structure of Item 1-19, it is possible to prevent that printing exposure is conducted from a photographic film inserted in the wrong lane, because when a photographic film with a wrong width is inserted at least in the lane arranged at the printing position, it is detected that the photographic film with a wrong width is inserted.

Incidentally, printing exposure from a photographic film inserted in the wrong lane can be prevented by "installation of a warning means which warns when erroneous insertion is detected by the erroneous insertion detecting means", or printing exposure from a photographic film inserted in the wrong lane can be prevented by "installation of a prohibiting means which prohibits printing exposure when erroneous insertion is detected by the erroneous insertion detecting means", or printing exposure from a photographic film inserted in the wrong lane can be prevented by "installation of an ejecting means which ejects a photographic film from a lane when erroneous insertion is detected by the erroneous insertion detecting means", or printing exposure from a photographic film inserted in the wrong lane can be prevented under the other condition.

Item 1-20

A photographic printing apparatus capable of conducting printing exposure from a photographic film with a first width and also from a photographic film with a second width that is different from the first width, wherein there is provided a film carrier having a first lane for passing a photographic film with the first width through and a second lane for passing a photographic film with the second width through, and the first lane and the second lane can be positioned at the prescribed printing position through switching thereof by moving the film carrier, and there is provided an erroneous insertion detecting means which detects that a photographic film is inserted erroneously in the lane which is different from the lane arranged at the printing position.

In the structure of Item 1-20, occurrence of a mistake to conduct printing exposure from the photographic film inserted in the lane which is different from that arranged at the printing position can be prevented.

Incidentally, occurrence of a mistake to conduct printing exposure from the photographic film inserted in the lane which is different from that arranged at the printing position can be prevented by "installation of a warning means which warns when erroneous insertion is detected by the erroneous insertion detecting means", or a mistake to conduct printing exposure from the photographic film inserted in the lane which is different from that arranged at the printing position can be prevented by "installation of a prohibiting means which prohibits printing exposure when erroneous insertion is detected by the erroneous insertion detecting means", or a mistake to conduct printing exposure from the photographic film inserted in the lane which is different from that arranged at the printing position can be prevented by "installation of an ejecting means which ejects a photographic film from a lane when erroneous insertion is detected by the erroneous insertion detecting means", or a mistake to conduct printing exposure from the photographic film inserted in the lane which is different from that arranged at the printing position can be prevented under the other condition.

Item 1-21

A photographic printing apparatus capable of conducting printing exposure from a photographic film with a first width and also from a photographic film with a second width that is different from the first width, wherein there is provided a film carrier having a first lane for passing a photographic film with the first width through and a second lane for passing a photographic film with the second width through, and an insertion detecting sensor which detects that a photographic film is inserted in each entrance of the first lane and the second lane, and there is further provided a means which arranges the first lane and the second lane at the prescribed printing position by switching them by moving the film carrier automatically based on the results of detection made by the insertion detecting sensor.

In the structure of Item 1-21, occurrence of a mistake to conduct printing exposure from the photographic film inserted in the lane which is different from that arranged at the printing position can be prevented, whereby labor to arrange the first lane and the second lane to the prescribed printing position by switching them manually by moving the film carrier is made to be unnecessary.

Item 1-22

A photographic printing apparatus having therein a film carrier composed solidly of at least two lanes corresponding to plural films each having a different width and an optical system including a mirror and a projecting lens both for projecting, on a light-sensitive material, the frame images on the film positioned on the lane, for printing processing, wherein an optical path of the optical system is switched when a projection optical path corresponding to the film to be processed is not formed.

Due to the structure of Item 1-22, no problem is caused even when a person who is not familiar with operations fails to switch the optical system.

Item 1-23

The photographic printing apparatus according to Item 1-22, wherein information from the film insertion detecting means provided to correspond the two lanes and information from a state detecting means provided to detect the state of the optical system are used to switch the optical paths.

Due to the structure of Item 1-23, the film to be printed can be recognized by actual film insertion, even when the control section is set. Thus, it is possible to provide user-friendly apparatus.

Item 1-24

The photographic printing apparatus according to Item 1-22, wherein warning and/or indication is made when a combination of a size of the film and the light-sensitive material which has been set does not fall on the combination established in advance.

Due to the structure of Item 1-24, when an operator inserts a wrong film for the magnification rate and a paper size established in the beginning, warning is given. Therefore, erroneous printing can be prevented and natural resources are not wasted.

Item 1-25

The photographic printing apparatus according to Item 1-22, wherein the optical paths are switched by rotation of the mirror.

Since the rotation of the mirror does not require a big space, the structure of Item 1-25 makes switching of optical systems to be possible without requiring a space.

Item 1-26

The photographic printing apparatus according to Item 1-22, wherein a light-shielding means is provided between the film carrier and the projecting lens to cover an opening of the lane which is not used.

When a film is inserted in one of the two lanes and the other is empty, there is a fear that light leaks to expose a photographic paper. However, leakage of light can be prevented by the light-shielding means in the structure of Item 1-26.

Item 1-27

The photographic printing apparatus according to Item 1-22, wherein the mirror is rotatable, and a light-shielding means which intercepts incident light from an opening of the lane which is not used is substantially structured to be solid with the mirror.

Since switching of an optical path by means of the mirror determines the lane to be subjected to exposure, when it is interlocked with the mirror in the structure of Item 1-27, a problem is not caused.

Item 1-28

A photographic printing apparatus having therein a film carrier composed solidly of at least two lanes corresponding to plural films each having a different width and an optical system including a projecting lens for projecting, on a light-sensitive material, the frame images on the film positioned on the lane, for printing processing, wherein warning and/or display is conducted when a size of a film to be processed and a light-sensitive material set in advance are excluded from the combination of printing at the magnification determined in advance.

Item 1-29

The photographic printing apparatus according to Item 1-28, wherein information from a film insertion detecting means provided to correspond the two lanes and information from a detecting means which detects the aforesaid light-sensitive material are used to conduct warning and/or indication.

When the relation of a film size, a size of a photographic paper and the optical system magnification is out of the prescribed value, the structure of Item 1-28 or of Item 1-29 warns an operator that either or them has not been adjusted yet, thus, erroneous printing can be prevented.

Item 1-30

The photographic printing apparatus according to Item 1-28, wherein the film carrier is movable from the fixed section on the apparatus main body.

In the structure of Item 1-30, the film carrier is moved along the reference member on the apparatus to switch between two lanes, by which the parallelism can be secured.

Item 1-31

A photographic printing apparatus having therein a film carrier composed solidly of at least two lanes corresponding to plural films each having a different width and an optical system including a projecting lens for projecting, on a light-sensitive material, the frame images on the film positioned on the lane, wherein the film is conveyed only when the film to be processed is in the lane existing on the optical path.

Once the conveyance of a photographic paper is started, it is difficult to interrupt it or to return it, and a photographic paper tends to be wasted. The structure of Item 1-31, however, can prevent waste of a photographic paper because it starts processing after detecting that the film to be processed is set on the lane.

Item 1-32

The photographic printing apparatus according to Item 1-31, wherein warning and/or indication is conducted when the film is not in the lane on the optical path.

The structure of Item 1-32 further prevents waste of a photographic paper because it urges switching of lanes and switching of photographic papers.

Item 1-33

A photographic printing apparatus having therein a film carrier composed solidly of at least two lanes corresponding to plural films each having a different width and an optical system including a projecting lens for projecting, on a light-sensitive material, the frame images on the film positioned on the lane, for printing processing, wherein the film carrier is caused to change its position automatically so that the film may be positioned on the optical path for printing, when the film to be processed is inserted in another lane on the film carrier which is out of the optical path for printing.

In the structure of Item 1-33, an error is notified to an operator, and the film carrier is moved automatically to an appropriate position for exposure, which results in high efficiency.

Item 1-34

The photographic printing apparatus according to Item 1-22, 1-28, 1-31 or 1-33, wherein at least one of warning, indication, conveyance interruption of other film and an ejection from the lane by reverse conveyance of the film is executed when other film is inserted in other lane in the course of processing for the film inserted in the lane on one side.

When a film is inserted in each of two lanes by mistake, troubles are caused. Due to the structure of Item 1-34, however, troubles can be prevented because the film inserted subsequently is ejected out.

Item 1-35

A photographic printing apparatus having therein a film carrier composed solidly of at least two lanes corresponding to plural films each having a different width and an optical system including a rotatable mirror and a projecting lens for projecting, on a light-sensitive material, the frame images on the film positioned on the lane, wherein there is provided a light-shielding means between an opening for printing provided on the carrier and the projecting lens.

When a film is inserted in one of the two lanes and the other is empty, there is a fear that light leaks to expose a photographic paper. However, leakage of light can be prevented by the light-shielding means in the structure of Item 1-35.

Item 1-36

The photographic printing apparatus according to Item 1-35, wherein warning and/or indication id conducted when a light-shielding means is not positioned between the opening which is not used for printing and the projecting lens.

When the light-shielding means is not inserted and printing is repeated, a large number of erroneous prints are caused. However, the structure of Item 1-36 prevents these erroneous prints.

Item 1-37

The photographic printing apparatus according to Item 1-22, 1-28, 1-31, 1-33, or 1-35 wherein when a film is inserted in at least one lane, insertion of a film from other lanes is prohibited.

When a film is inserted in one of two lanes after the other lane thereof is loaded with a film, this causes erroneous operations. The structure of Item 1-36, however, can prevents the erroneous operations because a film is prevented from being inserted in another lane.

Structure Corresponding to Embodiment 2

Item 2-1

A photographic printing apparatus having therein a film carrier which conveys, by means of a conveyance means, an image recorded on a negative film to a position where exposure or reading is possible, or conveys the image on the negative film positioned at the position, wherein there are provided a first conveyance path through which the film carrier conveys the first negative film and a second conveyance path through which the second negative film which is different from the first negative film in terms of a length in the direction of its width is conveyed, and a part of each of the first conveyance path and the second conveyance path is arranged vertically, and both of them are made to form a common path in terms of at least aforesaid position.

In the structure of Item 2-1, the conveyance paths for conveying negative films each being different from others in terms of a length in the direction of a width are made to have a common position, and thereby different negative films can be conveyed without adversely affecting exposure or reading, and plural negative films each being different in terms of a length in the direction of a width can be conveyed.

Item 2—2

The second conveyance path and the position both stated above are mostly on the same plane.

Due to the structure of Item 2—2, the second negative film can be conveyed smoothly. In particular, when the second negative film is a 135 type film, it is sometimes closer to a strip, compared with an IX 240 type film, and yet the conveyance thereof can be conducted smoothly.

Item 2-3

On each of the first conveyance path and the second conveyance path at the position where the first conveyance path and the second conveyance path are arranged vertically, there is provided a guide member corresponding to the length in the direction of a width of a film to be conveyed.

The structure of Item 2-3 can guide a negative film conveyed through each conveyance path to be on the position accurately.

Item 2-4

A holding section which holds a cartridge that houses therein an IX 240 type film is provided at a first insertion inlet in which an IX 240 type film is inserted to be capable of retreating to the position where conveyance of a 135 type film is not adversely affected.

Due to the structure of Item 2-4, it is possible to make conveyance paths for both films to be close to each other, and thereby the conveyance directions for films are not changed sharply when guiding them to the common path, which makes smooth film conveyance possible.

Item 2-5

The aforesaid conveyance means located at the position where the first conveyance path and he second conveyance path are arranged vertically has three rollers each being in contact with other one roller.

The structure of Item 2-5 makes the conveyance means to be simple and realizes cost reduction.

Structure Corresponding to Embodiment 2

Item 3-1

A film carrier of a photographic printing apparatus having the following structure wherein a film conveyance guide complying with two film types each having a different film width and being switched in terms of position for either film width with a center line in the conveyance direction on a film image plane and a film conveyance plane both held in the same way, is provided on both sides of the center line in the conveyance direction, and the conveyance guide is composed of a first guide member which has a guide surface corresponding to the first film width and guiding three surfaces such as an obverse side, a reverse side an edge of the side edge portion of the film, and a guide surface corresponding to the second film width and guiding the reverse side only or the reverse side and an edge of the side edge portion of the film, and a second guide member having a guide surface corresponding to the second film width and guiding an obverse side and an edge or the obverse side only of the side edge portion of the film, and the first guide member and the second guide member are housed slidably in a guide frame provided on the base body of the film conveyance device, and they move in the direction perpendicular to the film conveyance plane to be opposite each other in terms of direction so that they may be switched to the position to guide in three directions for either one of two film types.

Item 3-2

A film carrier of a photographic printing apparatus having the following structure wherein a film conveyance guide complying with two film types each having a different film width and being switched in terms of position for either film width with a center line in the conveyance direction on a film image plane and a film conveyance plane both held in the same way, is provided on both sides of the center line in the conveyance direction, and the conveyance guide is composed of a guide member which has a guide surface corresponding to each film width and guiding three surfaces such as an obverse side, a reverse side and an edge of the side edge portion of the film, and can slide on the reference plate of the base body of the film conveyance device in parallel with the film conveyance plane, whereby the guide member can slide to the position where it can guide each prescribed film for three directions to be positioned and set on the reference plate.

Item 3—3

The conveyance guide is switched based on detection signals from a film width detector.

Item 3-4

When the film width does not agree with the width of the conveyance guide, warning is given.

(Explanation of Terminology)

A lane means a path for a photographic film. It is preferable that the lane has a guide which guides a photographic film from at least one side out of the obverse side and the reverse side thereof, and it is preferable that the lane has a regulating guide which regulates both sides of a photographic film, because the position of the photographic film in the direction of its width can be regulated in the printing position.

A film carrier is one which has a lane to pass a photographic film through and positions frame images recorded on the photographic film at the prescribed printing position in the appropriate direction.

The printing position is a position on a photographic printing device which positions frame images recorded on the photographic film for the printing from the frame images recorded on the photographic film.

A mask is an opening formed at the printing position on the lane which is arranged at the printing position for printing from frame images recorded on the photographic film through this opening.

A print size is an image size of frame images formed, in the course of printing exposure, on a light-sensitive material for print use subjected to printing exposure from a photographic film. When the print size is made to agree perfectly with a size of a light-sensitive material for print use to be subjected to printing exposure, it is possible to obtain a marginless print with no trimming, while when the print size is made to be smaller than the size of a light-sensitive material for print use to be subjected to printing exposure, it is possible to obtain a marginate print with no trimming, and when the print size is greater than the size of a light-sensitive material for print use to be subjected to printing exposure, it is possible to obtain a marginless print with trimming.

A 135 type film is a photographic film having a 135 size, and it is a photographic film having a width of about 35 mm wherein rectangular frame images (full size) each measuring approx. 36 mm (longitudinal direction)×approx. 24 mm (lateral direction) are usually arranged in the longitudinal direction to be recorded, but in some cases, a rectangular frame image (panoramic size) measuring approx. 36 mm (longitudinal direction)×approx. 12 mm (lateral direction) is recorded, or a rectangular frame image (half size) measuring approx. 16 mm (longitudinal direction)×approx. 24 mm (lateral direction) is recorded.

An IX 240 type film is a photographic film satisfying IX 240 standards, and it is a photographic film having a width of about 24 mm, and rectangular frame images (full size) each measuring approx. 30 mm×approx. 17 mm are arranged in the longitudinal direction to be recorded.

BRIEF DESCRIPTION OF THE DRAWINGS

FIG. 15 (*b*) is an illustrative diagram showing the top face of a film carrier in Embodiment 2—2.

DETAILED DESCRIPTION OF THE PREFERRED EMBODIMENT

A concrete example of the invention will be explained as follows as an embodiment to which the invention is not limited. In the embodiment, there are some conclusive expressions in terms of terminology, but they just show preferable examples of the invention, and do not limit meanings of terminology and technical scope of the invention.

Embodiment 1

In a photographic printing apparatus of the present embodiment, a first conveyance path (first lane 1) for conducting printing exposure from an image of a 135 type film (having a width of 35 mm) representing a photographic film with a first width and a second conveyance path (second lane 2) for conducting printing exposure from an image of a photographic film (having a width of 24 mm) satisfying IX 240 standards, which represents a photographic film with a second width differing from the first width are provided in parallel on the same plane of film carrier 3, so that the first conveyance path or the second conveyance path may be switched to be arranged at the prescribed printing position by moving the film carrier.

Embodiment 1—1

Figure 1:
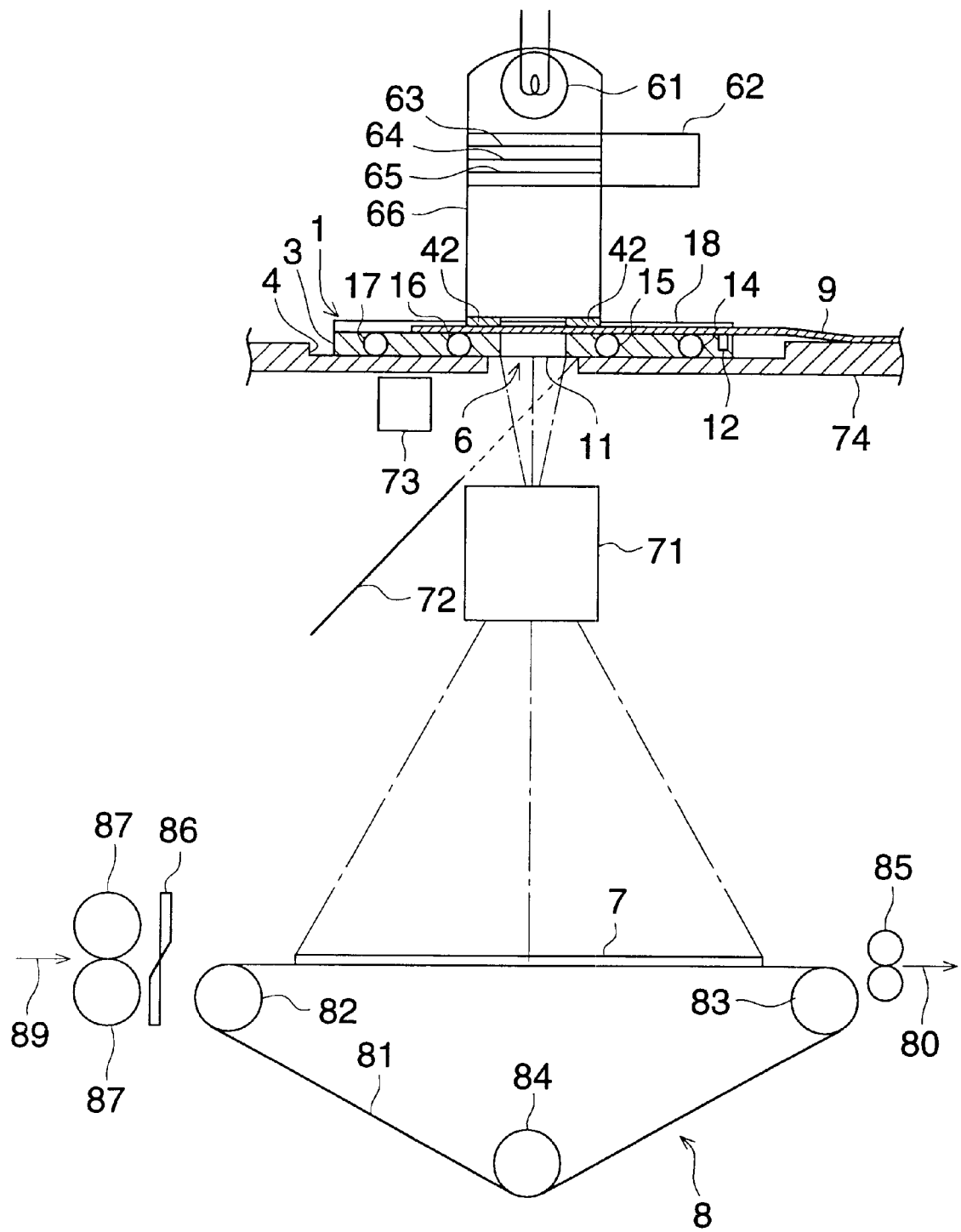
FIG. 1 is a schematic diagram of a photographic printing apparatus in Embodiment 1.

First, the schematic structure of a photographic printing apparatus in Embodiment 1—1 will be explained based on FIG. 1.

Carrier 3 is equipped with first lane 1 and second lane 2, and positions successively frame images recorded on photographic film 9 inserted in the lane arranged at printing position 6 on mask 11. White light source 61 emits white light, and emission at the white light source 61 is adjusted to a light source color corresponding to exposure conditions for each image frame by yellow filter 63, magenta filter 64 and cyan filter 65 driven by color filter driving section 62, and illuminates a frame image positioned on mask 11 of photographic film 9, with uniform distribution of quantity of light realized by diffusion box 66.

For the printing exposure from photographic film 9 in the lane (first lane is arranged in FIG. 1) arranged at printing position 6 to photographic paper 7 representing a light-sensitive material for print use, printing lens 71 forms, on the photographic paper 7, a frame image recorded on photographic film 9 which has passed a mask (mask 11 of the first lane in FIG. 1) of the lane arranged at the printing position 6. This printing lens 71 is a zoom lens whose printing magnification is determined and controlled by an unillustrated control section. Incidentally, for the printing lens 71, it is also possible to select a single-focus lens having the printing magnification determined by the control of a control section from single-focus lenses with plural printing magnifications each being different from others arranged on the serration, and to arrange it on the printing optical path. In place of the photographic paper 7, a film for print use may also be supplied.

Further, mirror 72 is provided in a way that it can be inserted in or retreated from the optical path of the printing lens 71 on the part of a mask. Further, electronic camera 73 is provided at the position where photographic film 9 located at the mask position can be photographed under the condition that the mirror 72 is inserted in the optical path. The photographic film 9 is positioned on the mask by moving it one frame by one frame toward the left in FIG. 1 under the condition that the mirror 72 is inserted in the optical path, then an image of each frame is photographed by the electronic camera 73, thus an unillustrated control section determines exposure conditions for each frame image based on information of this photographed frame image. Then, the photographic film 9 is positioned on the mask to be subjected to exposure under the determined exposure conditions, by moving it one frame by one frame toward the right in FIG. 1.

With regard to a photographic paper, a leading edge of a light-sensitive material loaded in an unillustrated roll magazine is fed in the feeding direction 89 to exposure stand 8 by paired conveyance rollers 87, and when the light-sensitive material is fed by the length corresponding to the size of photographic paper 7 to be printed, it is cut by cutter 86 through control of the control section to the length of the size of the photographic paper 7 to be printed, and then it is fed to the exposure stand 8.

By means of conveyance belt 81 trained about driving roller 84 and driven rollers 82 and 83, the exposure stand 8 conveys the photographic paper 7 while vacuum-attracting it. The driving roller 84 drives the conveyance belt 81 to rotate by the distance corresponding to the size of the photographic paper 7 through control of the control section to position it at the prescribed printing position, and then drives the conveyance belt 81 to rotate by the distance corresponding to the size of the photographic paper 7 after completion of printing, to send the photographic paper 7 to paired feed-out rollers 85, and feeds out the photographic paper 7, which has been completed in terms of printing in the feed-out direction 80, together with the paired feed-out rollers 85. On the conveyance belt 81, there are provided a large number of holes for the purpose of vacuum attraction, whereby the photographic paper 7 is attracted through these holes to be moved, stopped and held so that the photographic paper 7 may not be deviated on the conveyance belt 81 until the photographic paper 7 thus fed is fed out to the paired feed-out rollers 85.

Next, film carrier 3 of a photographic printing apparatus in the present embodiment is one on which the first lane 1 to pass a 135 type film through and the second lane to pass an IX 240 type film through are provided to be in parallel. The film carrier of the photographic printing apparatus in the present embodiment will be explained as follows, referring to FIG. 2, which represents a schematic structure diagram of the first state of the film carrier in the photographic printing apparatus in the present embodiment.

Incidentally, both of a 135 type film and an IX 240 type film represent a photographic film on which a plurality of frame images are arranged in the longitudinal direction to be recorded. On most of the 135 type films, frame images in a full size or a half size are recorded in the longitudinal direction at corresponding prescribed intervals, but on some photographic films, frame images are recorded at staggered intervals, which makes it indispensable to detect the position of frame images for positioning frame images on mask 11 automatically. On the contrary, the position of perforations arranged at prescribed intervals and the position of frame images are in the prescribed relation in the case of the IX 240 type film. It is therefore possible to detect the position of frame images simply be detecting the position of perforations.

Owing to guide for movement in the longitudinal direction 5 which guides a straight edge of film carrier 3, it is possible to move the film carrier 3 in longitudinal direction 50. When the film carrier 3 is moved in the longitudinal direction 50 from the first state (the state shown in FIG. 2), which is the state wherein the first lane 1 is arranged at prescribed printing position 6 in the lateral direction when viewed from an operator, it is possible to create the second state (the state shown in FIG. 3) wherein the second lane 2 is arranged at prescribed printing position 6 in the lateral direction when viewed from an operator. When the film carrier 3 is moved in the longitudinal direction 50 from the second state (the state shown in FIG. 3), which is the state wherein the second lane 2 is arranged at printing position 6 in the lateral direction when viewed from an operator, it is possible to create the first state (the state shown in FIG. 2) wherein the first lane 1 is arranged at printing position 6 in the lateral direction when viewed from an operator. Thus, it is possible to arrange the first lane 1 and the second lane 2 at printing position 6 by switching them by moving the film carrier 3, and whereby to arrange a 135 type film and an IX 240 type film at printing position 6, thus it is possible to print from the 135 type film and the IX 240 type film without replacement of a film carrier, which worsens work efficiency.

The first lane 1, when arranged at printing position 6 (the state shown in FIG. 2 and the state shown in FIG. 4), has mask 11 to be positioned at the printing position 6, and the second lane 2, when arranged at printing position 6 (the state shown in FIG. 3), has mask 21 to be positioned at the printing position 6. The mask 11 of the first lane 1 can be changed depending on a size of a frame image of a 135 type film, and it can be switched to approx. 36 mm×approx. 24 mm for a full size, approx. 36 mm×approx. 12 mm for a panoramic size, and to approx. 16 mm×approx. 24 mm for a half size.

Figure 4:
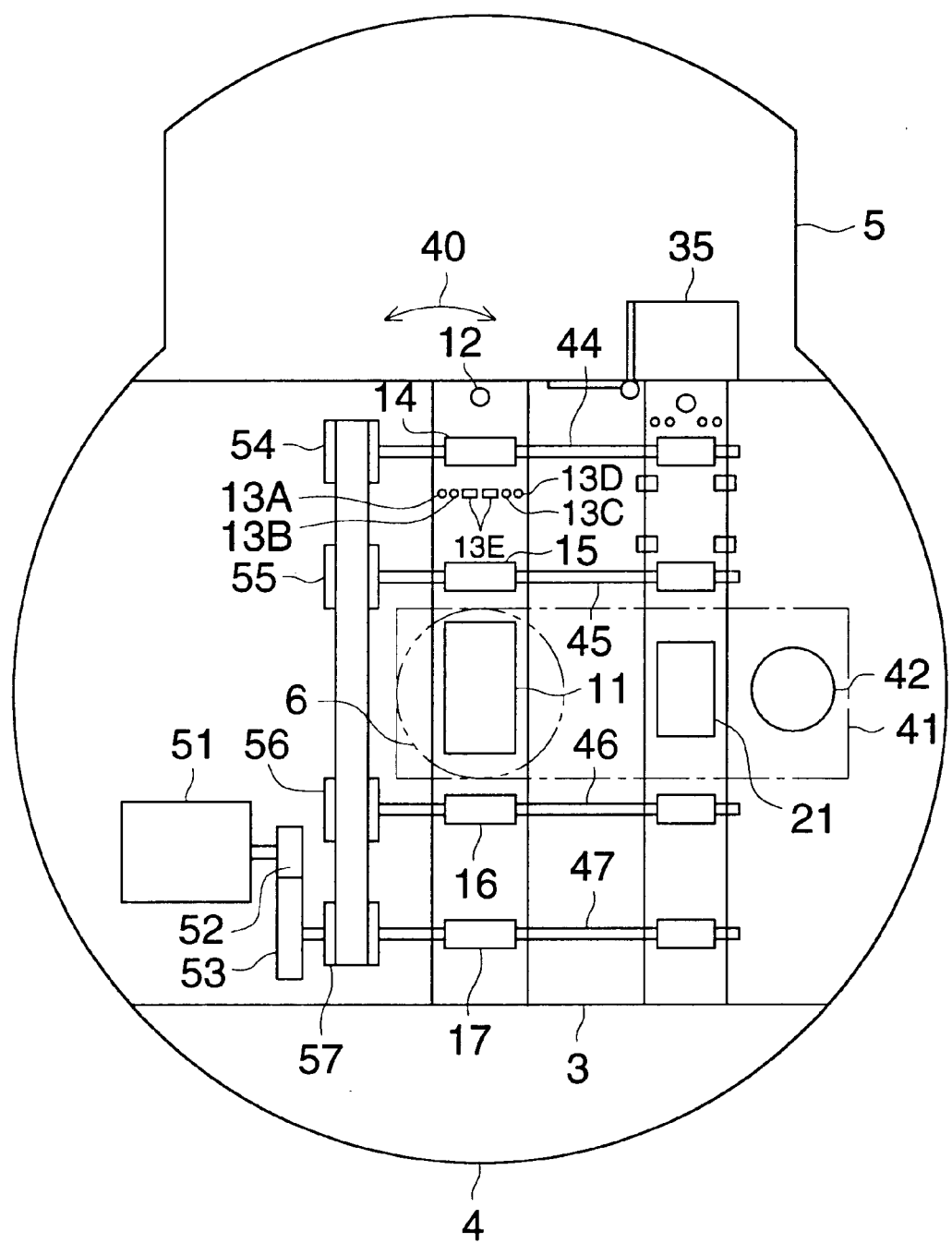
FIG. 4 is a schematic structure diagram of a film carrier in Embodiment 1—1 (Top view). (Third state)

When the first lane 1 is arranged at the printing position 6 (the state shown in FIG. 2 and the state shown in FIG. 4), film carrier 3 can be rotated in rotation direction 40 by rotation guide 4, which guides circular-arc-shaped edge of the film carrier 3. Thereby, it is possible to arrange the mask 11 positioned at the printing position 6 lengthwise when it is seen from an operator, as shown in FIG. 4. Including that it is possible to print from a frame image recorded to be half size on a 135 type film on an L size photographic paper (approx. 89 mm×approx. 127 mm), which is the same direction and the same size as in printing from a frame image recorded to be full size on a 135 type film on an L size photographic paper (approx. 89 mm×approx. 127 mm), prints in the same direction and in the same size can easily be obtained from either of a frame image recorded to be half size on a 135 type film and a frame image recorded to be full size on a 135 type film.

An unillustrated control section determines the printing magnification of printing lens 71 in accordance with a lane arranged at printing position 6, and it determines an aperture of the printing lens 71 based on the printing magnification (the smaller aperture for the greater printing magnification is preferable because it offers necessary depth of field) and exposure conditions. Due to this, it is possible to conduct printing exposure simply from a photographic film on a photographic paper, making the printing magnification of the printing lens 71 to be appropriate.

At the entrance of first lane 1 of film carrier 3, there is provided insertion detecting sensor 12, and this insertion detecting sensor 12 detects that photographic film 9 is inserted in the first lane 1. Further, at the entrance of second lane 2 of the film carrier 3, there is provided insertion detecting sensor 22 which detects that photographic film 9 has been inserted in the second lane 2. Detection signals of these insertion detecting sensors 12 and 22 are sent to an unillustrated control section, which detects whether a photographic film has been inserted in the first lane or not and whether a photographic film has been inserted in the second lane or not, using the detection signals.

Incidentally, at the entrance where the insertion detecting sensor 22 of the second lane 2 of the film carrier 3 is provided, there is provided cartridge feeding section 35 through hinge 36 in a way to be capable of being mounted and dismounted. This cartridge feeding section 35, when it is under the state that it is removed from the entrance of the second lane 2, can load and unload an APS cartridge housing therein a photographic film, and it feeds a photographic film from the loaded APS cartridge to the second lane 2 under the state that it is set to the entrance of the second lane 2. The cartridge feeding section 35 makes the photographic film returned from the second lane 2 to be housed in the APS cartridge. Incidentally, the cartridge feeding section 35 is arranged so that it can not leave the entrance of the second lane 2 during the period from the start of feeding a photographic film to the second lane 2 from the APS cartridge to the moment when the photographic film has completely been housed. On the contrary, the first lane 1 of the film carrier 3 feeds a 135 type film through manual feeding.

Figure 2:
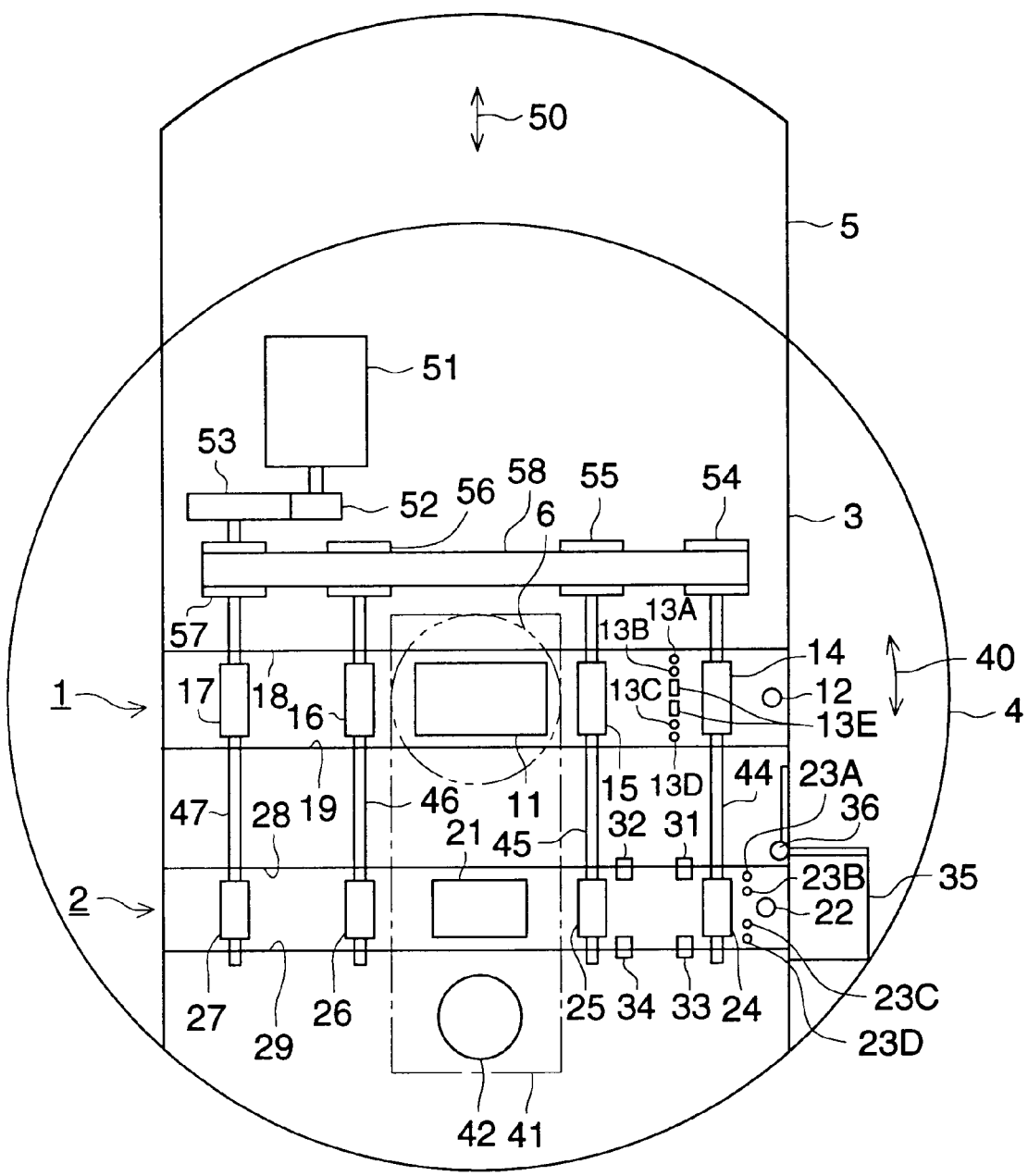
FIG. 2 is a schematic structure diagram of a film carrier in Embodiment 1—1 (Top view). (First state)
Figure 3:
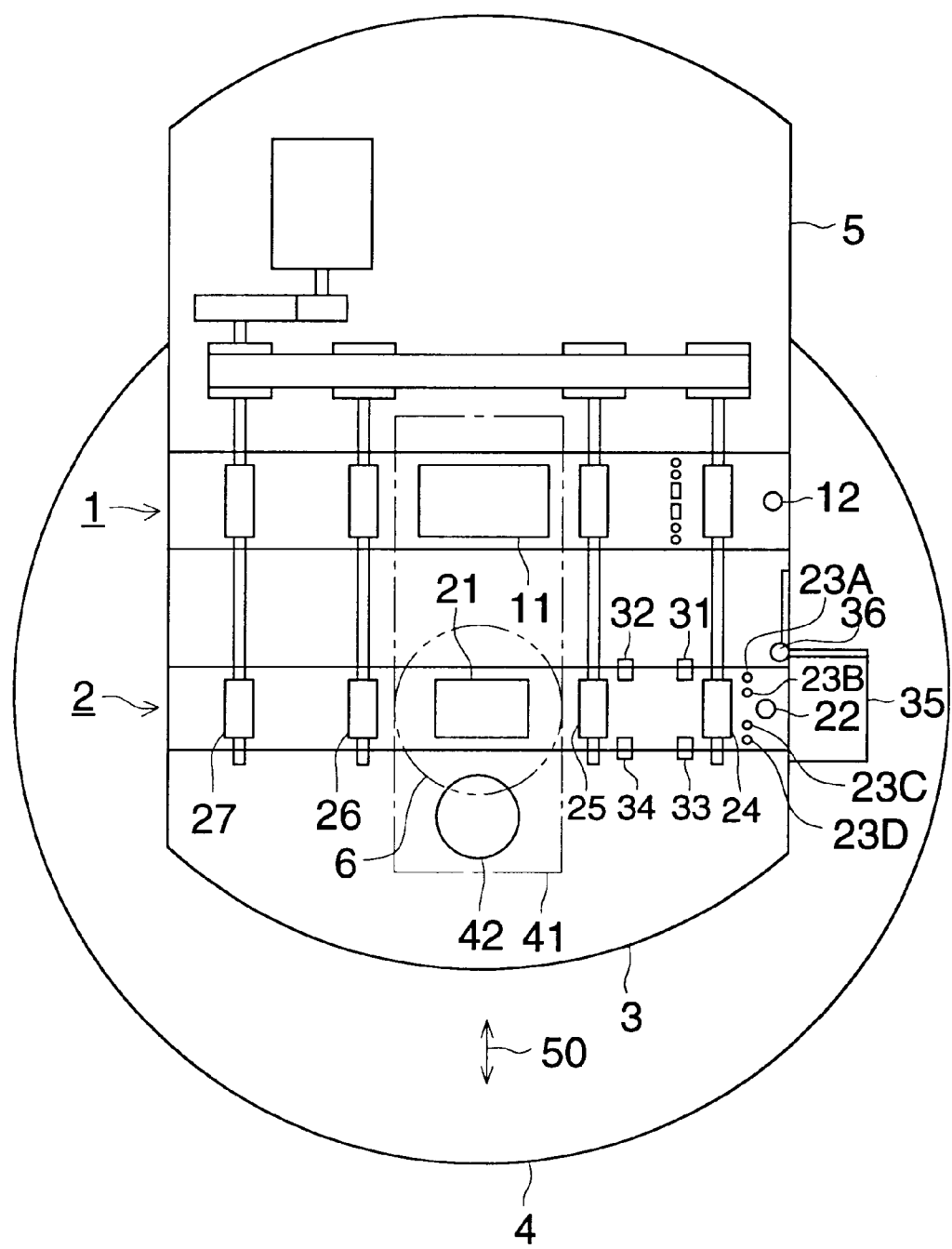
FIG. 3 is a schematic structure diagram of a film carrier in Embodiment 1—1 (Top view). (Second state)

Further, there is provided an unillustrated detector which detects how the film carrier 3 is arranged, and this unillustrated detector, which detects the state of arrangement of the film carrier 3, detects whether or not the state of arrangement is either one of the first state wherein the first lane 1 is in the printing position 6 and the mask 11 is arranged crosswise when viewed from an operator, as in the state shown in FIG. 2, the second state wherein the second 2 lane is in the printing position 6 and the mask 21 is arranged crosswise when viewed from an operator, as in the state shown in FIG. 3, the third state wherein the first lane 1 is in the printing position 6 and the mask 11 is arranged lengthwise when viewed from an operator, as in the state shown in FIG. 4, and the fourth state which is none of the above states. Depending on the results of the detection representing either one of the first through fourth states which are made by the unillustrated detector detecting the state of arrangement of the film carrier 3, an unillustrated control section selects information of a sensor to be utilized and controls each section by changing the contents to be controlled.

For example, if the control section detects that a photographic film is inserted in the first lane or the second lane when the state is detected to be the fourth state by the aforesaid detector first, the control section gives a warning sound assuming that a photographic film is inserted when the film carrier 3 has not been moved and set completely, and controls so that printing exposure may be prohibited until the normal state returns. Due to this, it is possible to prevent occurrence of a mistake to conduct printing exposure from a photographic film when the film carrier 3 has not been moved and set completely.

If the control section detects that a photographic film is inserted in the first lane when the state is detected to be the second state by the aforesaid detector, or if the control section detects that a photographic film is inserted in the second lane when the detector detects the state to be the first state or to be the third state, namely when the control section detects that a photographic film is inserted in the line, which is different from that arranged at the printing position, it gives a warning sound and controls so that printing exposure may be prohibited until the normal state returns. Due to this, it is possible to prevent occurrence of a mistake to conduct printing exposure from a photographic film at the erroneous lane or under the erroneous state.

The normal state in this case means the state wherein a photographic film is not inserted in any of the first and second lanes, the state wherein a photographic film is inserted only in the first lane under the first or the third state, and the state wherein a photographic film is inserted only in the second lane under the second state.

The unillustrated control section determines a size and the printing magnification of photographic paper 7 to be subjected to printing exposure from photographic film 9 in the lane arranged at printing position 6 based on the lane arranged at the printing position 6. For example, in the case of the first state wherein the first lane 1 is arranged at printing position 6 crosswise, the printing exposure is for obtaining a marginless print trimmed from a frame image in a full size on a 135 type film, and a choice is made from the printing magnification of approx. 4.0 at L size (approx. 89 mm×approx. 127 mm) and from the printing magnification of approx. 7.9 at panoramic size (approx. 89 mm×approx. 254 mm) are selected, in the case of the third state wherein the first lane 1 is arranged at printing position 6 lengthwise, the printing exposure is for obtaining a marginless print trimmed from a frame image in a half size on a 135 type film, and printing magnification of approx. 6.0 at L size (approx. 89 mm×approx. 127 mm) is selected, and in the case of the second state wherein the second lane 2 is arranged at printing position 6, the printing exposure is for obtaining a marginless print trimmed from an IX 240 type film, and a choice is made from the printing magnification of approx. 6.0 at C size (approx. 89 mm×approx. 127 mm), printing magnification of approx. 9.4 at P size (approx. 89 mm×approx. 254 mm) and from the printing magnification of approx. 6.0 at H size (approx. 89 mm×approx. 158 mm). Due to this, it is simple to conduct printing exposure on photographic paper 7 in an appropriate size. It is also possible to arrange so that the printing magnification of about 5.2 at Hi-vision size (high-definition television size) (approx. 89 mm×approx. 158 mm) may be selected.

Further, there is provided motor 51 on first lane 1 on the film carrier 3 to be located at the position opposite to the second lane 2. Owing to this, magnetic heads 31–34 stated later are not adversely affected by the magnetic field generated by the motor 51.

Around a shaft of the motor 51, there is fitted sprocket 52, and the rotation of gear 53 to which the rotation of the sprocket 52 is transferred and the rotation of the motor 51 are reduced to be transmitted to shaft 47. Pulley 57 is fitted around the shaft 47 whose rotation is transmitted to belt 58. Roller 17 is fitted around the position of the first lane 1 on the shaft 47, while roller 27 is fitted around the position of the second lane 2, and they respectively convey a photographic film on the first lane 1 and that on the second lane 2. The belt 58 is entrained about pulleys 54, 55 and 56 so that the rotation of the belt 58 may be transmitted to pulleys 54, 55 and 56. The pulleys 54, 55 and 56 are fitted respectively on shafts 44, 45 and 46 so that rotation of each pulley may be transmitted to each shaft. On the shafts 44, 45 and 46, there are respectively fitted rollers 14, 15 and 16 at the position of the first lane, and there are respectively fitted rollers 24, 25 and 26 at the position of the second lane so that a photographic film on the first lane and that on the second lane are respectively conveyed.

As stated above, the motor 51 drives to convey a photographic film on any of the first lane 1 and the second lane 2. Owing to this, cost of the mechanism for conveyance can be reduced. Incidentally, the rotation drive of the motor 51 is controlled based on conveyance control of an unillustrated control section.

Namely, a photographic film on the lane arranged at printing position 6 is conveyed under the conveyance control corresponding to the lane arranged at the printing position 6. Incidentally, the conveyance control corresponding to the lane arranged at the printing position 6 includes frame advancing control, which conveys a photographic film to position frame images successively at masks 11 and 12, in accordance with the lane arranged at the printing position 6. Due to this, when the first lane is arranged at printing position 6 (the state shown in FIG. 2), a photographic film on the first lane is conveyed under the conveyance control such as the frame advancing control matching a 135 type film, and when the second lane is arranged at printing position 6 (the state shown in FIG. 3), a photographic film on the second lane is conveyed under the conveyance control such as the frame advancing control matching an IX 240 type film, thus the conveyance control such as the frame advancing control matching the photographic film to be printed can be set automatically, and work efficiency can be improved greatly.

When the first lane 1 is arranged at the printing position 6 (the state shown in FIG. 2), the frame advancing control makes image detecting sensor 13E detects a frame image of a photographic film, then conveys the photographic film based on the position of the frame image detected by the image detecting sensor 13E, and positions the frame image at mask 11, and when the second lane 2 is arranged at the printing position 6, the frame advancing control conveys the photographic film based on perforations of the photographic film and positions the frame images successively at mask 11. Due to this, for a 135 type film, the frame advancing control is excellent despite the frame image arrangement, which does not satisfy the aforesaid prescribed law, and for an IX 240 type film, the frame advancing control is extremely excellent because a photographic film is conveyed based on perforations of the photographic film and frame images are positioned at mask 21 in succession, thus, the frame advancing control matching the photographic film to be printed can be set automatically, and thereby the excellent frame advancing control can be set automatically for both a 135 type film and an IX 240 type film, and work efficiency can be improved greatly.

On the second lane 2, there are provided magnetic heads 32 and 34 which record magnetic information of an IX 240 type film, which has been conveyed to the second lane, and there further are provided magnetic heads 31 and 33, which read magnetic information of the IX 240 type, film which has been conveyed to the second lane 2.

When the second lane 2 is arranged at printing position 6 (the state shown in FIG. 3), the control to convey a photographic film with IX 240 standards is conducted so that magnetic information may be recorded on or read from an IX 240 type film by magnetic heads 31–34. This makes recording or reading of magnetic information of the IX 240 type film to be excellent.

On the first lane 1, there are provided reading sensors 13A–13D each detecting bar-code information such as a DX code and a frame number code recorded on a 135 type film. There is further provided a frame image detecting sensor 13E, which detects the position of a frame image on the 135 type film. On the second lane 2, there are provided reading sensors 23A–23D each detecting bar-code information such as a code showing a print size recorded on an IX 240 type film and detecting perforations.

The frame image detecting sensor 13E provided on the first lane 1 detects the position of a frame image on a 135 type film from the change of light and shadow on the photographic film which has been conveyed.

Figure 6:
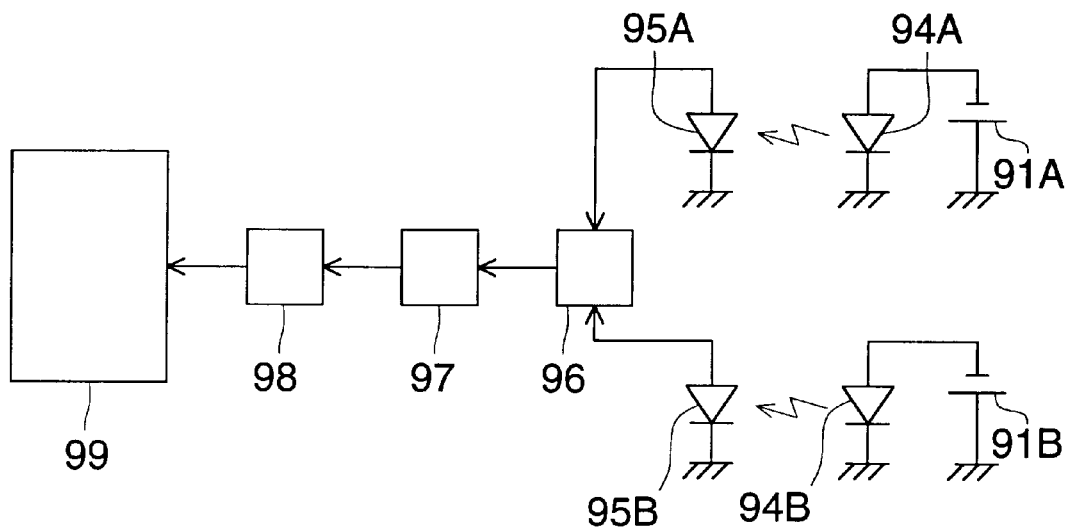
FIG. 6 is a schematic circuit diagram of a sensor circuit in Embodiment 1—1 and Embodiment 1-2.

These reading sensors 13A–13D and reading sensors 23A–23D are switched so that detection results of the reading sensor of the lane arranged at printing position 6 may be transmitted to a reading circuit. This will be explained based on FIG. 6, which is a schematic circuit diagram of a sensor circuit in the present embodiment.

Light-intercepting sensor 95A is provided at the position where light of LED 94A passed through a photographic film at the position where a bar-code is recorded can be intercepted by LED 94A and the light-intercepting sensor 95A constituting each sensor of the reading sensors 13A–13D. In the same way, light-intercepting sensor 95B is provided at the position where light of LED 94B passed through a photographic film at the position where a bar-code is recorded can be intercepted by LED 94B and the light-intercepting sensor 95B constituting each sensor of the reading sensors 23A–23D.

The LED 94A is connected to DC power supply 91A and is lit constantly, while LED 94B is connected to DC power supply 91B and is lit constantly. Therefore, both light-intercepting sensors 95A and 95B are constantly generating some detection signals.

Light-intercepting sensors 95A and 95B are connected to switching circuit 96 which switches so that detection signals from the light-intercepting sensor arranged at printing position 6 may be transmitted to reading circuit 99 through the control of an unillustrated control section.

The switching circuit 96 is connected to amplifier 97, which amplifies detection signals of the light-intercepting sensor on the lane arranged at printing position 6. The amplifier 97 is connected to A/D converter 98, which digitizes amplified detection signals of the light-intercepting sensor on the lane arranged at printing position 6. The A/D converter 98 is connected to reading circuit 99, which reads bar-code information recorded on photographic film 9 from detection signals of reading sensors 13A–13D or reading sensors 23A–23D on the lane arranged at printing position 6, based on digitized detection signals of the light-intercepting sensor of the lane arranged at the printing position 6.

Due to this, it is possible to use the amplifier 97, A/D converter 98 and reading circuit 99 in common between the first lane 1 and the second lane 2 without any problem, and thereby to reduce cost equivalent to the amplifier 97, the A/D converter 98 and the reading circuit 99.

The reading sensors 13A–13D also have a function to detect a width of a photographic film inserted in the first lane 1. In this case, the reading circuit 99 analyzes detection signals generated from the reading sensors 13A–13D to detect a width of a photographic film inserted in the first lane 1, and information about the detected width is sent to an unillustrated control section. When the unillustrated control section judges, based on the transmitted information about the width of a photographic film inserted in the first lane 1, that a photographic film with a wrong width is inserted erroneously, it detects that a photographic film with a wrong width is inserted erroneously, and then gives warning sound and controls to prohibit printing exposure until the photographic film with a wrong width has been ejected.

In the same way, the reading sensors 23A–23D also have a function to detect a width of a photographic film inserted in the second lane 2. In this case, the reading circuit 99 analyzes detection signals generated from the reading sensors 23A–23D to detect a width of a photographic film inserted in the second lane 2, and information about the detected width is sent to an unillustrated control section. When the unillustrated control section judges, based on the transmitted information about the width of a photographic film inserted in the second lane 2, that a photographic film with a wrong width is inserted erroneously, it detects that a photographic film with a wrong width is inserted erroneously, and then gives warning sound and controls to prohibit printing exposure until the photographic film with a wrong width has been ejected.

Due to this, when a photographic film is inserted in the wrong lane, printing exposure from that film can be prevented.

Figure 7:
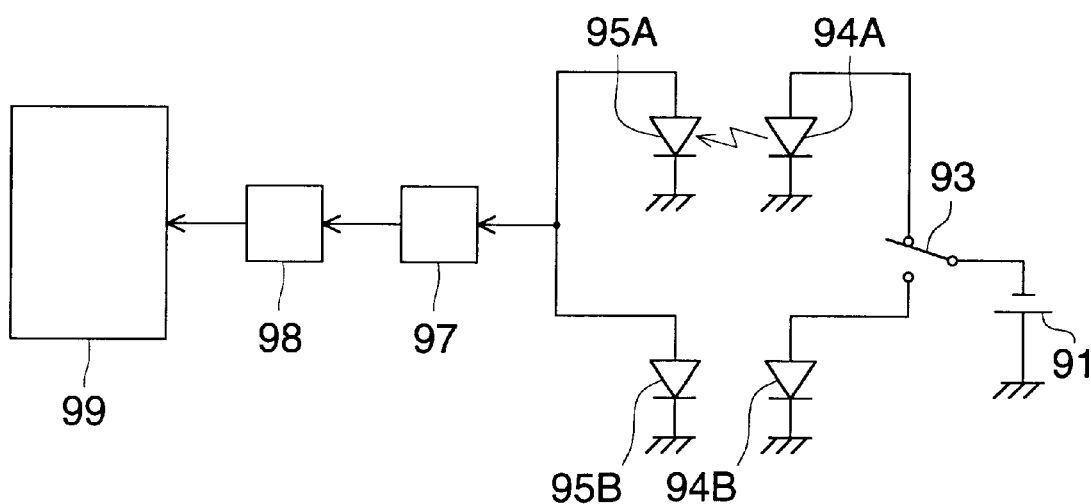
FIG. 7 is a schematic circuit diagram in the variation state of a sensor circuit in Embodiment 1—1 and Embodiment 1-2.

Next, a variation of the sensor circuit of the present embodiment will be explained with reference to FIG. 7 representing a schematic circuit diagram of the variation of the sensor circuit of the present embodiment.

Light-intercepting sensor 95A is provided at the position where light of LED 94A passed through a photographic film at the position where a bar-code is recorded can be intercepted by LED 94A and the light-intercepting sensor 95A constituting each sensor of the reading sensors 13A–13D. In the same way, light-intercepting sensor 95B is provided at the position where light of LED 94B passed through a photographic film at the position where a bar-code is recorded can be intercepted by LED 94B and the light-intercepting sensor 95B constituting each sensor of the reading sensors 23A–23D.

The LED 94A and LED 94B are connected to switch 93 which is connected to DC power supply 91A, and through the control of an unillustrated control section, LED 94A or LED 94B of the lane arranged at printing position 6 is connected to DC power supply 91A. Therefore, the LED 94A or the LED 94B connected by the switch 93 emits light, and corresponding light-intercepting sensor 95A or light-intercepting sensor 95B intercepts light to generate detection signals, and switch 93 controlled by an unillustrated control section switches so that detection signals of the light-intercepting sensor of the lane arranged at printing position 6 may be transmitted to reading circuit 99.

The light-intercepting sensors 95A and 95B are connected to amplifier 97, which amplifies detection signals of the lane arranged at printing position 6. The amplifier 97 is connected to A/D converter 98 which digitizes the amplified detection signals of the light-intercepting sensor of the lane arranged at printing position 6. The A/D converter 98 is connected to reading circuit 99, which reads bar-code information recorded on photographic film 9 from detection signals of reading sensors 13A–13D or reading sensors 23A–23D of the lane arranged at printing position 6, based on digitized detection signals of the light-intercepting sensor of the lane arranged at printing position 6.

Due to this, it is possible to use the DC power supply 91, the amplifier 97, the A/D converter 98 and the reading circuit 99 in common between the first lane 1 and the second lane 2 without any problem, and thereby to reduce cost equivalent to the DC power supply 91, the amplifier 97, the A/D converter 98 and the reading circuit 99.

Next, film pressure plate 41 of film carrier 3 will be explained. The film pressure plate 41 is one with which the photographic film 9 is brought into pressure contact with each lane on the side of mask 11 and mask 21 by pressure solenoid 42 for any of the first lane 1 and the second lane 2 so that excellent printing exposure may be conducted. Immediately after the frame image of photographic film 9 is positioned at each of masks 11 and 12, the film pressure plate 41 is brought into pressure contact with the side of masks 11 and 21 by pressure solenoid 42. Thereby, the photographic film 9 is brought into pressure contact with each lane on the side of masks 11 and 21 so that the film may not be lifted for excellent printing exposure. Then, upon completion of printing exposure, the film pressure plate 41 is released from the side of the masks 11 and 21 by the pressure solenoid 42, so that the photographic film 9 may be conveyed satisfactorily without problems of deformation and positional deviation.

Embodiment 1-2

Figure 5:
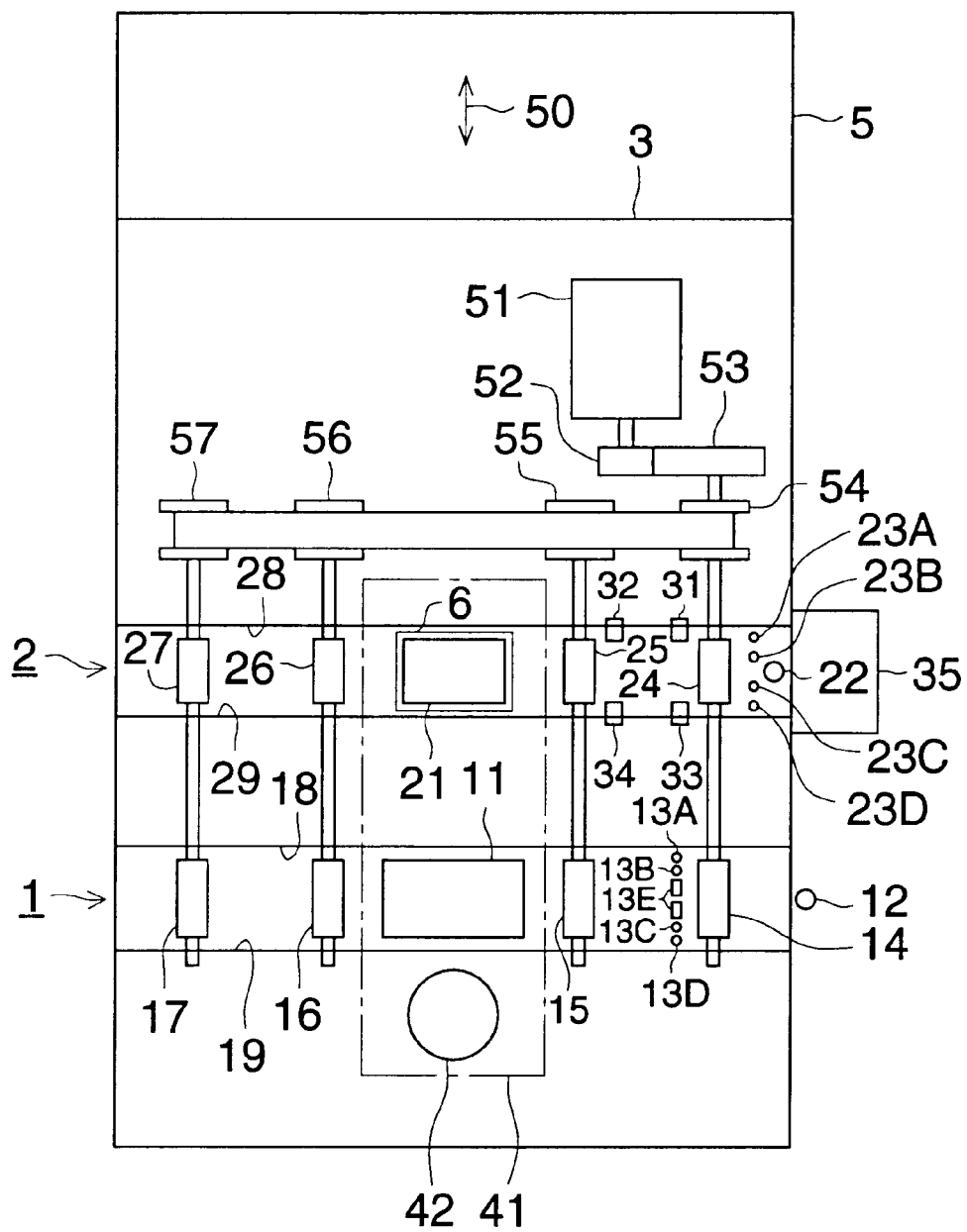
FIG. 5 is a schematic structure diagram of a film carrier in Embodiment 1-2 (Top view).

A photographic printing apparatus of the present embodiment is a variation of the photographic printing apparatus of Embodiment 1—1, and only difference between them is structure of film carrier 3. Now, only points of difference from Embodiment 1—1 will be explained as follows with reference to FIG. 5, which is a schematic structure diagram of the film carrier in the present embodiment.

In film carrier 3 of the present embodiment, second lane 2 through which an IX 240 type film is passed is provided on this side when viewed from an operator, when the film carrier 3 is moved in the lengthwise direction 50 from the state A (the state shown in FIG. 5) wherein the second lane 2 is arranged at the prescribed printing position 6 in the crosswise direction when viewed from an operator, the state can be shifted to the state B wherein the first lane 1 is arranged at printing position 6 in the crosswise direction when viewed from an operator. As stated above, each of the first lane 1 and the second lane 2 can be arranged at printing position 6 through the switching between the first lane 1 and the second lane 2 only by moving the film carrier 3, whereby either of a 135 type film and an IX 240 type film can be arranged at printing position 6, and printing exposure can be conducted from those 135 type and IX 240 type films without replacement of film carrier which worsens work efficiency.

On the film carrier 3, there is provided motor 51 at the position which is opposite to the first lane 1 about the second lane 2. Owing to this, the motor 51 can be arranged on the part of the second lane 2, and thereby an IX 240 type film requiring high conveyance speed accuracy can be conveyed at high conveyance speed accuracy in a relatively simple manner.

Though the motor 51 is provided only at the position which is opposite to the first lane 1 about the second lane 2 on the film carrier 3 in the present embodiment, it is also possible to employ arrangement wherein a motor is provided also on the part of the first lane, and each lane is driven for conveyance by its own motor, so that the conveyance at high conveyance speed accuracy can be conducted more simply.

There is further provided a film carrier moving mechanism, which is composed of an unillustrated drive motor and a rack-and-pinion, to move film carrier 3 in the lengthwise direction 50. An unillustrated detector, which detects how the film carrier 3 is arranged, detects whether or not the state is either one of the state A, the state B and the state C which represents none of the state A and the state B. An unillustrated control section selects information of a sensor to be used or the like in accordance with detection results representing either one of the first state—the fourth state of an unillustrated detector which detects the state of arrangement of the film carrier 3, and controls each section by changing contents to be controlled.

For example, when the control section senses that a photographic film is inserted in the first lane 1 or the second lane 2 when the detector is detected to be in the state C, the film carrier moving mechanism moves the film carrier 3 so that the lane in which the photographic film is inserted may be arranged at printing position 6. When the control section senses that a photographic film is inserted in the first lane 1 when the detector is detected to be in the state A, or when the control section senses that a photographic film is inserted in the second lane 2 when the detector is detected to be in the state B, namely when a photographic film is detected to be inserted in the lane which is different from that arranged at printing position 6, the film carrier moving mechanism moves the film carrier 3 so that the lane in which the photographic film is inserted may be arranged at the printing position 6.

Under the state wherein a photographic film is inserted in the first lane 1 in the state B, or a photographic film is inserted in the second lane 2 in the state A, the film carrier moving mechanism does not drive, but motor 51 drives the photographic film to be conveyed.

Due to the film carrier moving mechanism, which moves film carrier 3 automatically based on the results of detection made by insertion detection sensors 12 and 22 and arranges the first lane or the second lane at the prescribed printing position 6 through by switching them, it is possible to prevent occurrence of errors to try printing exposure from photographic film 9 inserted in the lane which is different from that arranged at the printing position 6, which makes labor to move the film carrier 3 manually, and to arrange the first lane or the second lane at the prescribed printing position 6 by switching them to be unnecessary.

Embodiment 1-3

A photographic printing apparatus of the present embodiment is a variation of the photographic printing apparatus of Embodiment 1—1, wherein three magazines each supplying unillustrated photographic paper can be set so that photographic paper supplied from each of the three magazines set can be selected. In the photographic printing apparatus, a photographic paper can be selected from a magazine housing therein photographic paper with a width of approx. 89 mm, a magazine housing therein photographic paper with a width of approx. 127 mm and a magazine housing therein photographic paper with a width of approx. 254 mm as aforesaid three magazine, to be supplied to the printing position. Points of difference from Embodiment 1—1 will now be explained.

The leading edge of a light-sensitive material housed in the roll magazine is arranged to be fed from feeding direction 89 to exposure stand 8 by paired conveyance rollers 87 from each magazine.

When a frame image recorded on a 135 type film is of a half size, a photographic paper having a width of approx. 127 mm is fed out of a magazine housing therein a photographic paper with a width of approx. 127 mm, and printing exposure is conducted from a frame image recorded to be a half size on a 135 type film on an L-sized photographic paper (approx. 127 mm×approx. 89 mm) at printing magnification of about 6.0 times under the first state shown in FIG. 2. When the frame image recorded on a 135 type film is of a full size, a photographic paper having a width of approx. 127 mm is fed out of a magazine housing therein a photographic paper with a width of approx. 127 mm, and printing exposure is conducted from a frame image recorded to be a full size on a 135 type film on an L-sized photographic paper (approx. 127 mm×approx. 89 mm) at printing magnification of about 4.0 times under the second state shown in FIG. 2. When the frame image recorded on a 135 type film is of a panoramic size, a photographic paper having a width of approx. 254 mm is fed out of a magazine housing therein a photographic paper with a width of approx. 255 mm, and printing exposure is conducted from a frame image recorded to be a full size on a 135 type film on a panoramic size photographic paper (approx. 254 mm×approx. 89 mm)

at printing magnification of about 7.9 times under the second state shown in FIG. 2.

Due to this, the speed of feeding a photographic paper can be accelerated, and printing exposure can be conducted more efficiently.

Embodiment 1-4

Figure 8:
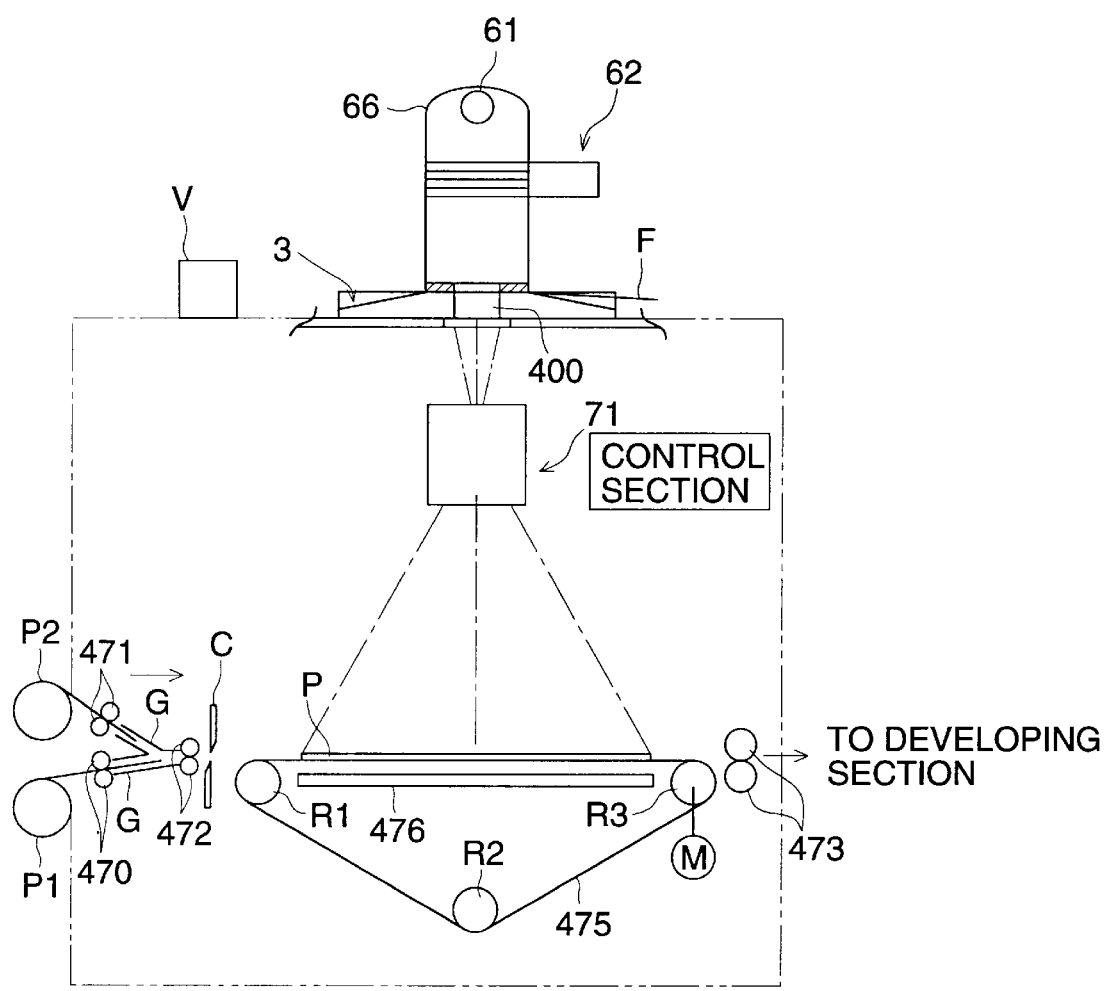
FIG. 8 is a diagram showing the schematic structure of a printing apparatus in Embodiment 1-4.

FIG. 8 shows an outline of the structure of a printing apparatus in Embodiment 1-4.

Figure 9:
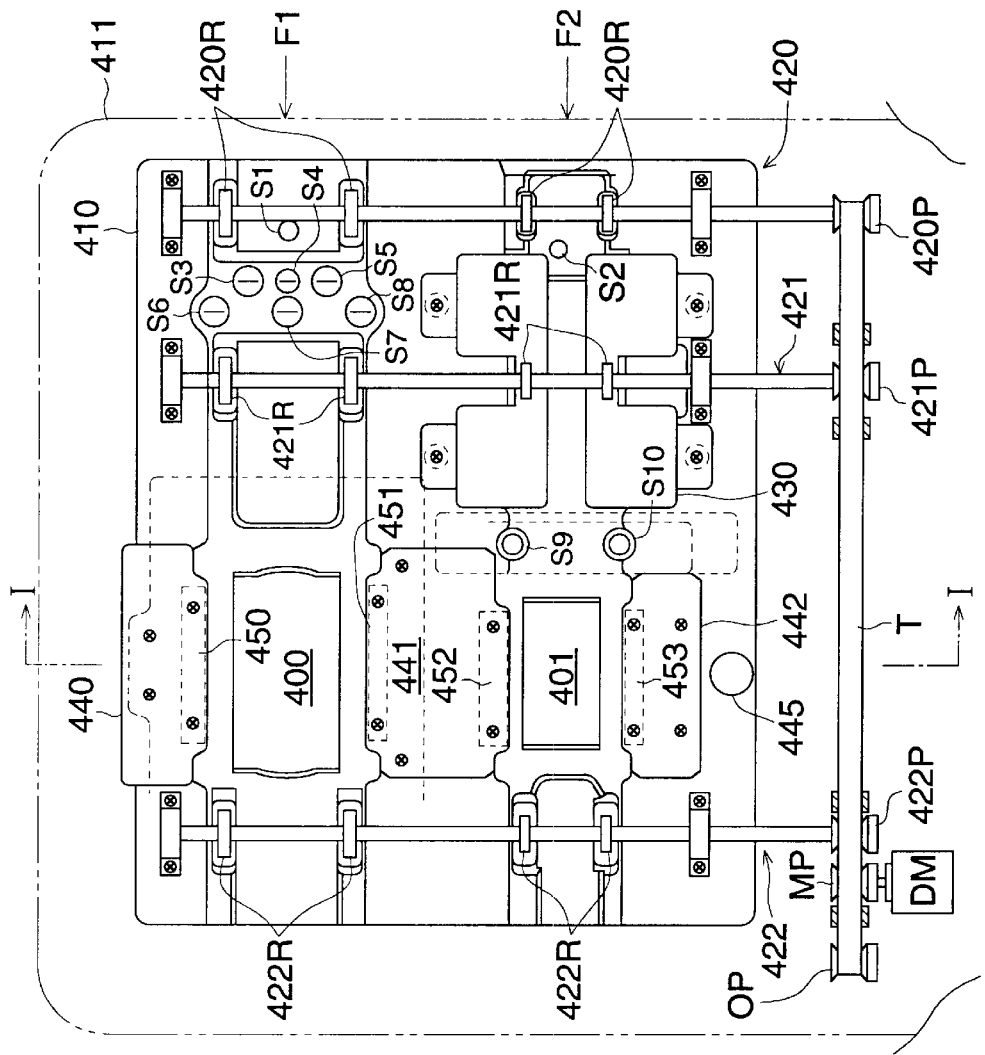
FIG. 9 is a plan view of a main body frame of a film carrier and a pressure base.

FIG. 9 is a top view including main body frame 411, base 410, an inner base of pressure base 460 and a driving system provided on the main body frame 411.

In FIG. 9, the numeral 410 represents an entire base made through die cast molding.

The numerals 420, 421 and 422 represent film conveyance means arranged on the base, and each of them has rollers 420R, 421R and 422R on the same axis to convey the first photographic film and the second photographic film.

The distance between the aforesaid rollers on the axis is a distance wherein both edges on the width of the film to be handled touch the insides of the rollers and the distance does not interfere the frame image area.

F1 represents the first lane in which the first photographic film is inserted, while F2 represents the second lane in which the second photographic film is inserted.

The numeral 400 is an aperture for the first photographic film and 401 is an aperture for the second photographic film.

Each of S1 and S2 represents a film insertion detecting means provided in the vicinity of an entrance of each of lanes F1 and F2 and is composed of LED.

In the first lane, S3–S8 located at the downstream side of the film insertion detecting means S1 are sensors, and S3 and S5 detect film base density information and edge information of frame images, S4 and S7 detect color image information, S6 detects perforation information, and S8 detects bar-code information, and they output them to the aforesaid control section or to a memory of the control section.

Each of the aforesaid sensors is composed of LED satisfying the aforesaid functions, and it is structured to obtain information through a very narrow slit which is obtained through plating on glass, and this LED forms a pair together with another LED to be provided also on a pressure base which is to be put on the foregoing to structure a sensor.

In the second lane F2, the numeral 430 located at the downstream side of the film insertion detecting means S2 is a magnetic head for writing information on a magnetic film portion coated on an edge portion in the crosswise direction of a film, or for reading information on the magnetic film portion.

On the downstream side of the magnetic head 430, there are provided sensors S9 and S10.

The sensor S9 detects information of perforations provided on a film corresponding to frames, and S10 detects bar-code information and printing information, and they output them to the aforesaid control section or to a memory of the control section.

The printing information stated above is one showing photographing information intended by an photographer in the course of photographing a subject, while it is necessary information for discriminating the intention of the photographer on the film, because photographing is conducted on a full image plane of a frame.

As a kind of photographing information, there are two kinds, one is for photographing on a full size of approx. 36 mm×approx. 24 mm (which is generally called "conventional") and the other is for photographing on a panoramic size of approx. 36 mm×approx. 12 mm.

The numerals 440, 441 and 442, which are present on a line connecting the apertures 400 and 401, represent a spring plate fixed on base 410 positionally with a screw.

On each spring plate, there are provided film pressure rails 450–453 at the portions facing the apertures 400 and 401.

Figure 10:
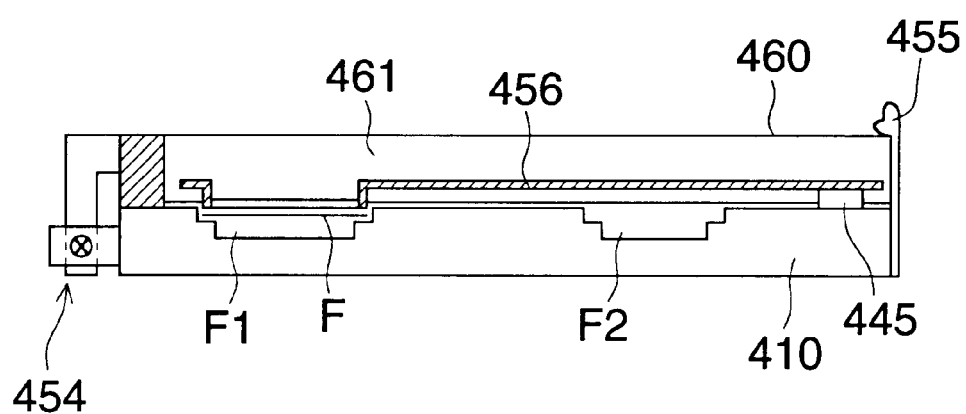
FIG. 10 is a diagram showing briefly how a film is fixed on a pressure mask.

FIG. 10 is a simplified sectional view taken on line I—I in FIG. 9.

The aforesaid film pressure rail forms a narrow tunnel together with a base surface which forms the aperture mentioned above, so that both edges of the film in its lateral direction may be prevented from being lifted at the frame section positioned to correspond to the aperture.

In FIG. 10, the numeral 460 is a pressure base, which can be swung around fulcrum 454 to be opened from and closed on base 410, structured to be locked by locking means 455 provided on the part of the base when that pressure base is closed.

An area on the pressure base 410 connecting the apertures 400 and 401 forms opening 461 where a pressure mask is to be installed.

In the opening 461, there is installed pressure mask 456 which is exclusively used for the first lane F1 so that it can be dismounted.

With regard to fixing of the film portion having a frame image to be printed actually, at least both edges of the film in its lateral direction are pressed on the base surface around the aperture by pressure mask 456 attracted by electromagnet 445 in the course of printing, so that the film is fixed.

Figure 11:
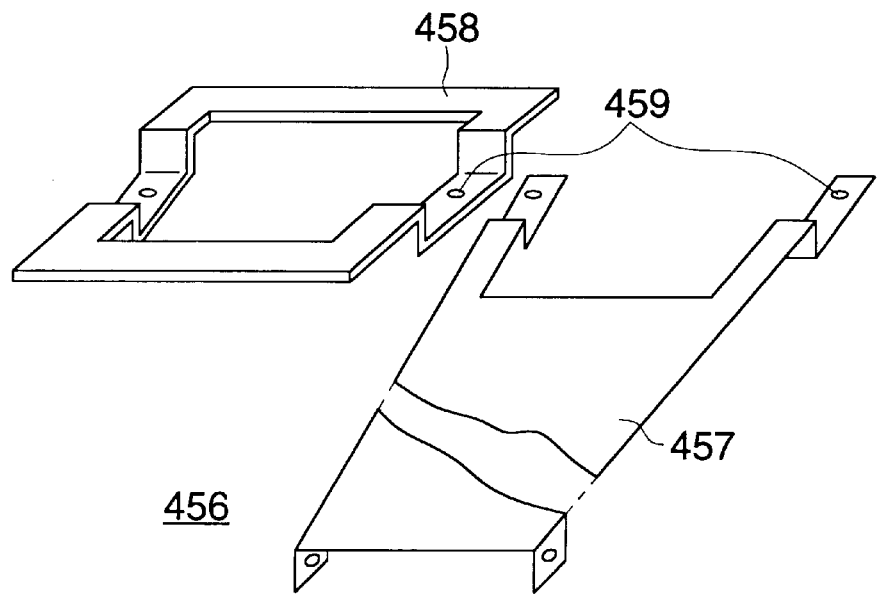
FIG. 11 is a diagram showing an example of the structure of a pressure mask.

The pressure mask 456 is composed of supporting portion 457 and mask portion 458 as shown illustratively in FIG. 11, and both of them are united loosely with a play at connecting portion 459 by means of an appropriate means.

When a part of the supporting portion 457 is attracted by the force of the electromagnet caused in printing, a part of the mask portion presses the pressure rail down, to finally fix the film.

In the drawing, the film is positioned on the upper step out of two steps in the sectional view.

Incidentally, the aforesaid electromagnet does not operate to attract after completion of printing, and is controlled so that the film may be moved for the subsequent printing.

An arrangement is made so that operations of the printing apparatus shown in FIG. 8 may be conducted based on the command from CPU (Central Processing Unit). An outline of the control will be explained as follows.

(1) When a photographic film is inserted in a certain lane of the film carrier in the case of ON of the power supply, output information from a film insertion detecting means (described later) provided to correspond to the lane is used to judge whether or not a width of the film matches the lane into which the film is inserted. If they match each other, the film is allowed to be conveyed for the following processing, while if they do not match each other, display and/or warning therefor are conducted by display/warning means V.

Whether the lane mentioned above is on the optical path for printing or not is confirmed by a detecting means for the state of an optical system, for example, by output information from a limit switch. If the position of the lane is wrong, the film carrier is moved automatically by a driving source such a motor, and then is stopped by signals from another limit switch, so that an adjustment may be made.

When it is judged from output information of a detecting means stated later that the photographic film is a 135 type film (first photographic film) and a frame image is of a half size, the carrier 3 is rotated automatically so that processing may be conducted.

In the foregoing, when the film does not correspond to the lane and/or when the film corresponds to the lane but the lane is not at the proper position for printing, conveyance of the film is prohibited until the lane is set to the appropriate state.

(2) After confirming that a preparation has been completed, a motor is driven and a group of conveyance rollers are driven to convey the aforesaid film.

In this case, when the photographic film stated above is the first photographic film, frame image information (barcode information, perforation information, information of frame leading edge and film base density information) are read by a sensor (detecting means) composed of plural LEDs provided on a film movement path, and information of the reading is accumulated in a memory.

(In the case of an IX 240 type film, printing information such as synchronization signal information and hi-vision, panoramic and conventional size information enter.)

The aforesaid scanning is conducted on a series of frames.

(3) Upon completion of the aforesaid scanning, the first photographic film is conveyed automatically by an amount equivalent to one frame in the direction opposite to the previous direction, and then is stopped at the position matching the aperture so that the pressure mask portion may be positioned properly and the frame to be printed may be kept in the stable condition by the plate members surrounding the mask forming section.

Conveyance control is made through calculation from the perforation information and the frame leading edge information.

(4) In this case, the printing magnification for the film size is determined on the table on a one-to-one correspondence basis (for example, printing of L size approx. 89 mm×approx. 127 mm), and photographic paper P2, for example, is selected by the command from the control section.

The length for advancing a photographic paper conveyed by conveyance rollers 470 and 472 is determined in the way wherein clock pulses following rotations of a motor or rollers are counted and the rotation thereof is stopped when the pulse arrives at the prescribed pulse number so that cutter C cuts the photographic paper.

When a combination of a film size and a photographic paper set does not agree with a combination determined in advance, display and/or warning is conducted by display/warning means V.

The aforesaid judgment can be conducted by using output information from a film insertion detecting means which will be stated later and from a light-sensitive material size detecting means.

The photographic paper after being cut is moved while it is attracted to belt 475, and then is positioned accurately at the printing position. Positional regulation is conducted by counting pulses generated by motor M, which is the same as in the foregoing.

(5) Printing processing is conducted by a shutter (not shown) arranged on an optical path while flatness of a photographic paper is kept through the operation of attracting means 476.

Color correction by means of three color filters is determined by calculation based on the frame image information.

(6) Upon completion of printing processing, the belt 475 is driven, and then an operation of the attracting means 476 is stopped when an end of the photographic paper arrives at exit roller 473.

In this case, it is also possible not to stop the operation of the attracting means.

The exit roller 473 is stopped after it has been driven for a sufficient period of time to hand the photographic paper over to a moving means on the part of a processing apparatus.

(7) During this period, the film is released from the pressure mask to be freed from its pressed state, and the film is further conveyed by an amount equivalent to one frame in the direction stated above so that the subsequent frame image is set to the printing position.

Further, the printing conditions are determined through calculation, and simultaneously with this, conveyance of the photographic paper, cutting and holding at the printing position are conducted in succession, and these operations are repeated as many times as required for controlling.

(8) During the period wherein a film inserted in a lane on one side is being processed, when a film with a different size is inserted in another lane, at least one of warning, display, stop conveying the film and ejection of the film from the lane by the reverse conveyance is executed.

Or, when a film is being processed, other lanes are mechanically closed so that insertion of other films into other lanes may be prohibited.

In the foregoing, with regard to detailed controls such as how to take frame image information on a film, color correction control based on the frame image information, control of conveyance means for films, and timing of selection and conveyance for a photographic paper, known methods can be employed.

When conducting printing processing from an IX 240 type film representing the second photographic film, information of perforation provided for each frame is used for conveyance to the printing position.

This perforation is one used for film advancing in photographing with a camera, and therefore, an interval between frame images on the film is constant, and control is simple, compared with an occasion where frame intervals are dispersed as in the case of a 135 type film.

Though a primary element of an optical system is a zoom lens with a fixed position in the structure above, it is also possible to employ a method wherein a plurality of single-focus lenses are prepared, and an appropriate lens among them is brought on an optical path when a holding plate for the single-focus lenses is rotated.

Figure 12:
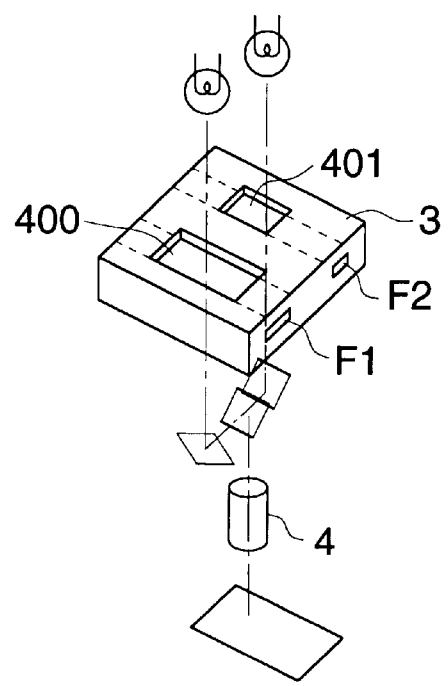
FIG. 12 is a diagram showing another embodiment of exposure control.

Further, though the film carrier is arranged to be movable against the fixed portion on the apparatus main body, it is also possible to employ an embodiment wherein the film carrier is fixed positionally, each being equipped with a light source corresponding to each lane, plural mirrors are provided on a swingable basis (rotatably) on this side of a projecting lens, the state of an optical system is detected by an appropriate detecting means from the mirror, and optical paths (optical axes) are switched so that printing can be conducted from frame images on the films positioned on two lanes by causing the mirror to swing, if necessary (see FIG. 12).

In that case, it is preferable that a light-shielding means is provided between a carrier and a projecting lens so that external light may not enter from an aperture on the lane which is not used as a mechanical component.

This light-shielding means (light-shielding member) can be provided to be substantially solid with a mirror, but when it is provided independently in addition to the foregoing, a means to detect whether the light-shielding means is present at a necessary place or not is required.

In an arrangement from the viewpoint of control, display and/or warning is conducted by display/warning means V when it is judged, from output information of the detecting means, that a light-shielding means is not present at a necessary place.

Figure 13:
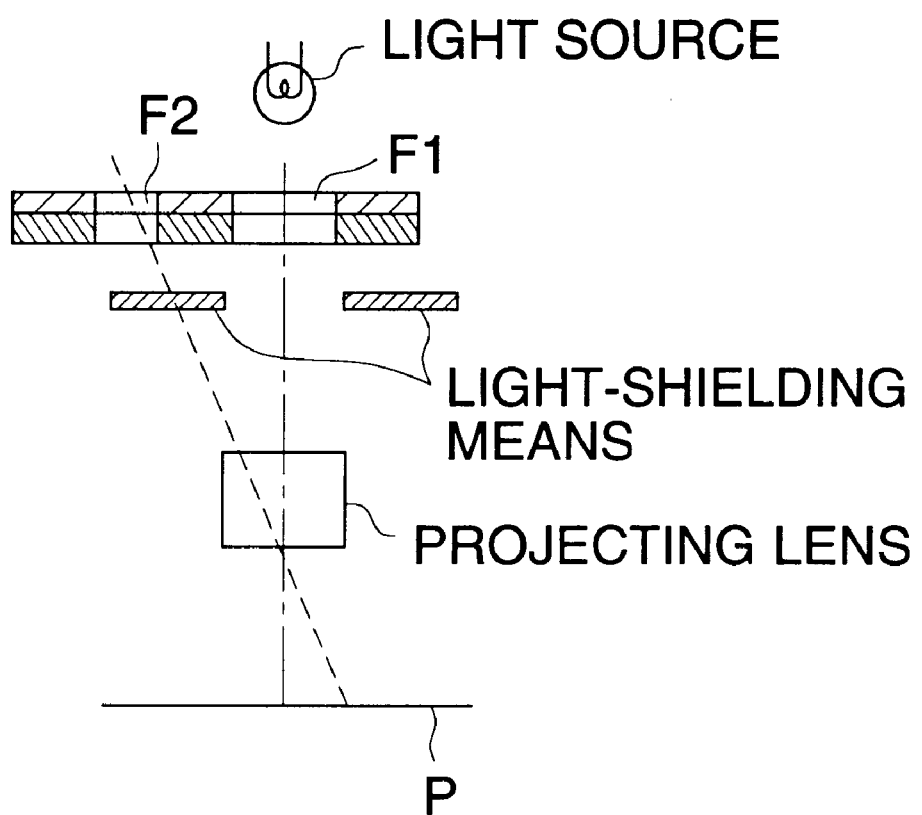
FIG. 13 is a diagram showing an embodiment of a light-shielding means in an exposure section.

FIG. 13 shows another structure wherein a carrier having plural lanes complying with plural films each having a different widths is provided to be movable, and a light-shielding means is provided between the carrier and a projecting lens or between an aperture and a projecting lens so that unwanted external light may not enter from an aperture on the unused lane, for the use of any lane on the carrier.

Namely, in the structure stated above, a light-shielding means of a fixed type is provided at the position which satisfies the aforesaid function to prevent light leakage from affecting the printing adversely. Because of the light-shielding means of a fixed type, there is no fear of occurrence of troubles, and the structure is simple and useful.

Effect of Embodiment 1

Due to Item 1—1 wherein conveyance is carried out under the conveyance control matching the lane arranged at the printing position, when the first lane is arranged at the printing position, a photographic film in the first lane is conveyed under the conveyance control matching the photographic film having the first width, and when the second lane is arranged at the printing position, a photographic film in the second lane is conveyed under the conveyance control matching the photographic film having the second width, thus the conveyance control matching the photographic film to be printed can automatically be realized.

Due to Item 1-2, the frame advancing control matching the photographic film to be printed can automatically be realized.

Due to Item 1-3, work efficiency is extremely improved because the frame advancing control matching the photographic film to be printed can automatically be realized.

Due to Item 1-4, an excellent frame advancing control can automatically be realized and work efficiency is extremely improved for both of a 135 type film and an IX 240 type film Due to Item 1-5, it is possible to record magnetic information on an IX 240 type film or to read magnetic information from an IX 240 type film.

Due to Item 1-6, the conveyance control matching the photographic film to be printed can automatically be realized.

Due to Item 1-7, it is possible to make the printing magnification of the printing lens to be appropriate and to conduct printing exposure easily from a photographic film onto a light-sensitive material for print use.

Due to Item 1-8, it is possible to make the printing magnification of the printing lens to be appropriate and to conduct printing exposure easily from a photographic film onto a light-sensitive material for print use.

Due to Item 1-9, it is possible to obtain easily a print complying the prescribed setting.

Due to Item 1-10, it is possible to make the printing magnification of the printing lens to be appropriate and to conduct printing exposure easily from a photographic film onto a light-sensitive material for print use.

Due to Item 1-11, it is possible to make the printing magnification of the printing lens to be appropriate and to conduct printing exposure automatically from a photographic film onto a light-sensitive material for print use.

Due to Item 1-12, it is possible to conduct easily printing exposure on a light-sensitive material for print use in an appropriate size.

Due to Item 1-13, it is possible to conduct printing exposure efficiently, because, when a lane is switched, the initial setting is made to the size of a light-sensitive material for print use which is the highest in terms of probability of being an appropriate size as a light-sensitive material for print use.

Due to Item 1-14, it is possible to conduct printing exposure efficiently, because, when a lane is switched, the initial setting is made to the size of a light-sensitive material for print use which is the highest in terms of probability of being an appropriate size as a light-sensitive material for print use, and the size of a light-sensitive material for print use can be changed immediately when it is not appropriate.

Due to Item 1-15, when the light-sensitive material for print use having the size set can not be supplied to the printing position, an error is outputted. It is therefore possible to take actions properly.

Due to Item 1-16, it is possible to reduce cost for a reading means by using the same reading means for the fist lane and the second lane in common.

Due to Item 1-17, it is possible to reduce cost of driving for conveyance.

Due to Item 1-18, it is possible to obtain easily the prints in the same direction and in the same size from both a frame image recorded to be of a half size on a 135 type film and a frame image recorded to be of a full size.

In the structure of Item 1-19, when a photographic film having a wrong width is inserted erroneously at least in the lane arranged at the aforesaid printing position, it is detected that a photographic film having a wrong width is inserted erroneously. Therefore, it is possible to prevent that printing exposure is conducted from the photographic film inserted in the wrong lane.

The structure of Item 1-20 can prevent occurrence of a mistake to try printing exposure from the photographic film inserted in the lane which is different from that arranged at the printing position.

The structure of Item 1-21 can prevent occurrence of a mistake to try printing exposure from the photographic film inserted in the lane which is different from that arranged at the printing position, and it makes labors to move the film carrier manually and to arrange the first lane or the second lane at the prescribed printing position by switching them to be unnecessary.

Embodiment 2

In the photographic printing apparatus in the present embodiment, a first conveyance path for conducting printing exposure for an image on a 135 type film representing a photographic film with a first width and a second conveyance path for conducting printing exposure for an image on an IX 240 type film representing a photographic film with a second width which is different from the first width are provided respectively over and under the film carrier, so that printing exposure can be conducted for the 135 type film and the IX 240 type film by switching between the first conveyance path and the second conveyance path with a switching means.

Embodiment 2-1

Embodiment 2-1 will be explained as follows, referring to FIG. 14 which is an illustration showing a sectional view of film scanner 101. Incidentally, one-dot chain lines in FIG. 14 indicates the first conveyance path through which an IX 240 type film is conveyed, while two-dot chain lines indicates the second conveyance path through which a 135 type film is conveyed.

Figure 14:
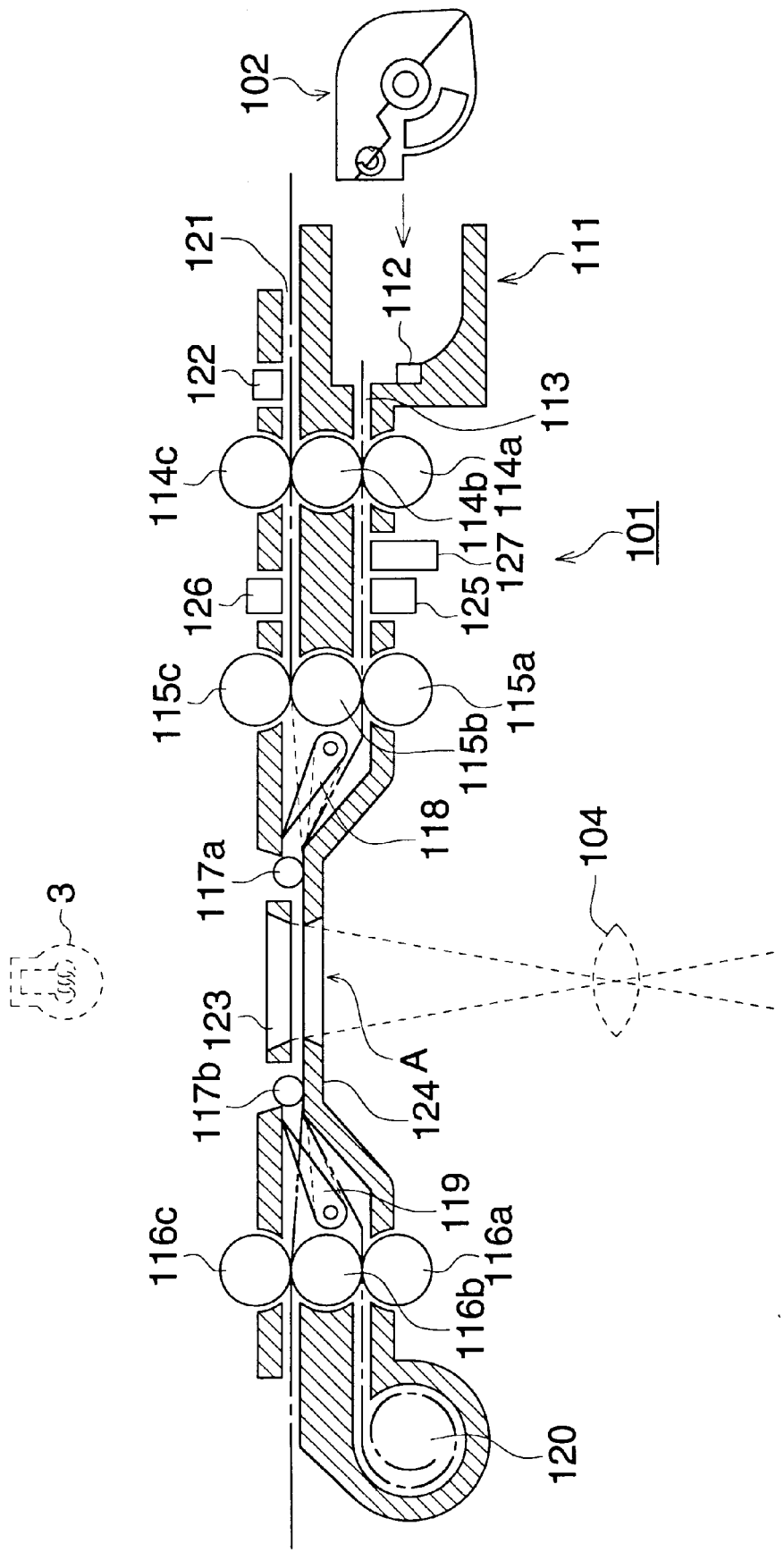
FIG. 14 is an illustrative diagram showing a section of a film carrier in Embodiment 2-1.

Film carrier 101 is one which conveys an image (frame) recorded on a negative film with a conveyance means to position A where exposure or reading is possible, or conveys an image on a negative film positioned at position A, and it is incorporated in a photographic printing apparatus wherein a photographic paper is exposed to the image recorded on a negative film through lens system 4 under light emitted from light source 103 as shown in FIG. 14, or incorporated in a film scanner to read with an image sensor such as a CCD, for example. Owing to this film carrier 101, it is possible to conduct exposure from, or to read plural images recorded on a negative film in succession.

In the film carrier 101 of the present embodiment, the first conveyance path (shown with one-dot chain lines) for conveying an IX 240 type film and the second conveyance path (shown with two-dot chain lines) for conveying a 135 type film are arranged in the vertical direction to have a common path only on the position A, as shown in FIG. 14. The expression "vertical" in this case represents the direction of a normal line on the surface of a negative film, and it is the vertical direction in FIG. 14. Due to this, the film position for exposure or reading is always constant for both an IX 240 type film and a 135 type film, making it unnecessary to change lens 4, a photographic paper and an image sensor. Further, each of the IX 240 type film and the 135 type film can be conveyed on an optimum basis because they are arranged vertically for conveyance although they are different in terms of a length in the crosswise direction of the film.

The film carrier 101 will be explained concretely as follows. Holding section 111 is a means to hold cartridge 102 in which an IX 240 type film is loaded, and one end of the holding section is open in the present embodiment, and the cartridge 102 inserted through this open end can be held. First detecting means 112 is a means to detect that the cartridge 102 is held by the holding section 111, and based on the detection of the first detecting means 112, an operation to feed out an IX 240 type film loaded in the cartridge 102 is started by an unillustrated means so that the IX 240 type film is inserted into first insertion inlet 113. Incidentally, based on the detection of the first detecting means 112, a conveyance means stated later and switching means 118 and 119 are controlled so that the IX 240 type film may be conveyed.

On the other hand, a 135 type film is inserted, while keeping its shape of a film strip, through second insertion inlet 121 provided on film carrier 1. Second detecting means 122 is a means to detect that a 135 type film has been inserted in the second insertion inlet 121, and based on the detection of the second detecting means 122, a conveyance means stated later and switching means 118 and 119 are controlled so that the 135 type film may be conveyed.

As a conveyance means, there are provided plural roller groups 114–117 in the present embodiment. Among these plural roller groups 114–117, roller groups 114, 115 and 116 respectively have three rollers 114*a*–114*c*, 115*a*–115*c* and 116*a*–116*c*, and each of the three rollers 114*a*–114*c*, 115*a*–115*c* and 116*a*–116*c* is one which is in contact with other rollers. For example, with regard to the structure of roller group 114, roller 114*a* is in contact with roller 114*b* and roller 114*b* is in contact with roller 114*c*. Therefore, it is possible to simplify the structure of a conveyance means for conveying an IX 240 type film and a 135 type film, and low cost can be achieved, which will be explained later. Further, in the present embodiment, either of an IX 240 type film and a 135 type film can be conveyed by making at least one roller out of three rollers to be a driving roller and making others to be driven rollers in each of roller groups 114–116 and by making the driving roller to rotate regularly and reversely, and it is further possible to make the conveyance path open easily and to improve maintainability by locating the driving roller to the edge of three rollers (for example, roller 114*a* or roller 114*c* is made to be a driving roller) and by making other rollers to be driven rollers. The roller group 117 is provided to interpose position A and thereby to stabilize conveyance of a negative film on position A.

Switching means 118 and 119 are means to switch so that an IX 240 type film can be conveyed through the first conveyance path, and a 135 type film can be conveyed through the second conveyance path. In the present embodiment, when conveying an IX 240 type film, switching means 118 and 119 are swung to be positioned at the upper portion (shown with solid lines) in the drawing, and when conveying a 135 type film, switching means 118 and 119 are swung to be positioned at the lower portion (shown with broken lines) in the drawing. Switching of the path conducted by each of the switching means 118 and 119 is carried out based on the results of the detection conducted by the first detecting means 112 or by the second detecting means 122.

Reservoir section 120 is a means to store an IX 240 type film temporarily, and it takes up an IX 240 type film conveyed by plural roller groups 114–117 inside thereof for storage as is illustrated. Since the IX 240 type film is handled to be united solidly with cartridge 102, it needs to be returned to the original cartridge 102 after being taken out of the cartridge 102 and being subjected to exposure or reading of images, and it is always a long roll film because it is not made to be a short film strip. From the background stated above, by providing the reservoir section 120, the IX 240 type film taken out of the cartridge 102 does not extend toward the left in the drawing, and uncontrollable damage can be prevented.

Pressure plate 123 is moved downward in the drawing when an image (frame) on a negative film comes to position A, and is brought into pressure contact with lower plate 124 through a negative film to make the negative film to be flat and to prevent vibration of the negative film in the course of exposure or reading. When the negative film is conveyed by a conveyance means, this pressure plate 123 does not come in pressure contact, and is open (as shown in FIG. 14). Further, each of the pressure plate 123 and the lower plate 124 is provided with an opening corresponding to an image (frame) on the negative frame, and the opening also functions as a mask.

The first sensor 125 and the second sensor 126 represent sensors for reading image information or optical information (bar-code or the like) recorded respectively on an IX 240 type film and a 135 type film. Magnetic head 127 is one which reads information recorded on a magnetic layer provided on the IX 240 type film, or writes information on the magnetic layer.

Incidentally, a guide member, which is not illustrated but corresponds in terms of a length in the crosswise direction of a negative film to be conveyed, is provided on each of the first and second conveyance paths, which are at the position where the first and second conveyance paths are arranged vertically, and the guide member regulates the crosswise direction of the negative film. On the common path at position A, there is provided a guide member corresponding to a 135 type film having no length in the crosswise direction.

Operations of the film carrier 101 will now be explained. First, an occasion wherein an IX 240 type film is conveyed will be explained.

Cartridge 102 housing therein an IX 240 type film is loaded in holding section 111. When the first detecting means 112 detects that the cartridge 102 has been held by the holding section 111, an unillustrated means feeds an IX 240 type film out of the cartridge 102, and switching means 118 and 119 are swung to be positioned at the upper portion, thereby rollers 114a, 115a, 116a, 117a and 117b are driven to rotate counterclockwise in the drawing. The IX 240 type film fed out of the cartridge 102 is conveyed by rollers 114a and 114b while being regulated in the crosswise direction by an unillustrated guide member, and then magnetic information thereon is read by magnetic head 127 and image information and optical information are read by the first sensor 125. Then, the IX 240 type film is further conveyed by rollers 115a and 115b while being regulated by an unillustrated guide member in terms of the crosswise direction, then it changes its direction toward the upper left portion in the drawing as it is guided by switching means 118 to join the second conveyance path (namely, to be conveyed through the common path), and is further conveyed by roller 117a. Then, after passing through the position A, it is nipped by roller 117b to be conveyed until the image thereon is located on the position A based on information obtained through reading by the first sensor 125 and magnetic head 127. When the image is located on the position A, pressure plate 123 comes in pressure contact with the IX 240 type film to keep its flatness, and exposure or reading of the image is conducted.

Then, the IX 240 type film is conveyed by rollers 116a and 116b while being regulated in terms of its crosswise direction by an unillustrated guide member, and is stored temporarily in reservoir section 120. In this case, conveyance of the IX 240 type film conducted by a conveyance means is driven intermittently so that the aforesaid exposure or reading is conducted each time the image is located at the position A. After completion of exposure or reading for all images, rollers 114a, 115a, 116a, 117a and 117b are driven to rotate clockwise in the drawing so that the IX 240 type film stored in the reservoir section 120 is guided into cartridge 102. Incidentally, there has been explained an occasion here wherein exposure or reading is conducted in the course of moving forth (when the IX 240 type film moves to the left). However, it is also possible to use a method wherein first sensor 125 and magnetic head 127 read information in the course of moving forth, and exposure or reading is conducted in the course of moving back.

On the other hand, when conveying a 135 type film, the 135 type film is inserted in the second insertion inlet 121, and when the second detecting means 122 detects the 135 type film, switching means 118 and 119 are swung to be positioned at the lower side, and rollers 114b, 115b, 116b, 117a and 117b are driven to rotate counterclockwise in the drawing. The 135 type film is conveyed by rollers 114b and 114c while being regulated in terms of the crosswise direction by an unillustrated guide member, and image information and optical information thereon are read by the second sensor 126. It is further conveyed by rollers 115b and 115c while being regulated in terms of the crosswise direction by an unillustrated guide member, then guided by switching means 118 and is further conveyed by roller 117a. Then, after passing through the position A, it is nipped by roller 117b to be conveyed until the image thereon is located on the position A based on information obtained through reading by the second sensor 126. When the image is located on the position A, pressure plate 123 comes in pressure contact with the 135 type film to keep its flatness, and exposure or reading of the image is conducted. The 135 type film is further conveyed by rollers 116b and 116c while being regulated in terms of the crosswise direction by an unillustrated guide member, and is ejected out of film carrier 101. In this case, conveyance of the 135 type film conducted by a conveyance means is driven intermittently so that the aforesaid exposure or reading is conducted each time the image is located at the position A.

As stated above, the first conveyance path and the second conveyance path have at least a part thereof arranged vertically and have a common path at least on the position A, therefore, the film position for exposure or reading is the same for an IX 240 type film and a 135 type film, making it unnecessary to change lens 104 or a photographic paper and an image sensor. Further, each of the IX 240 type film and the 135 type film can be conveyed on an optimum basis because they are arranged vertically for conveyance, although the IX 240 type film and the 135 type film are different in terms of a length in the crosswise direction of the film.

Further, in the present embodiment, the second conveyance path is provided to be almost on the same plane as the position A. For the 135 type film handled as a short film strip, therefore, a change in the conveyance path therefor is less, and conveyance can be stabilized. The 135 type film, in particular, is not always handled as a long roll film, which is different from the IX 240 type film, and it is weak for the change in the conveyance path in the case of a short film strip, especially in the case of 6 frames. However, stabilization of conveyance can be achieved by providing the second conveyance path to be almost on the same plane as the position A as stated above. Further, since the first conveyance path which conveys an IX 240 type film handled solidly with cartridge 102 is provided under the second conveyance path, it is possible to arrange the first conveyance path and the second conveyance path to be close to each other, and to limit the change in the first conveyance path to be minimum, thus stabilization of conveyance can be realized.

Though switching means 118 and 119 are provided in the present embodiment to realize stabilization of conveyance for each film, it is possible to eliminate the switching means 118 by providing guides properly. Further, although both sides on each of the first and second conveyance paths are provided vertically to interpose position A in the present embodiment, it is also possible to provide at least one side vertically.

Embodiment 2—2

Figure 15:
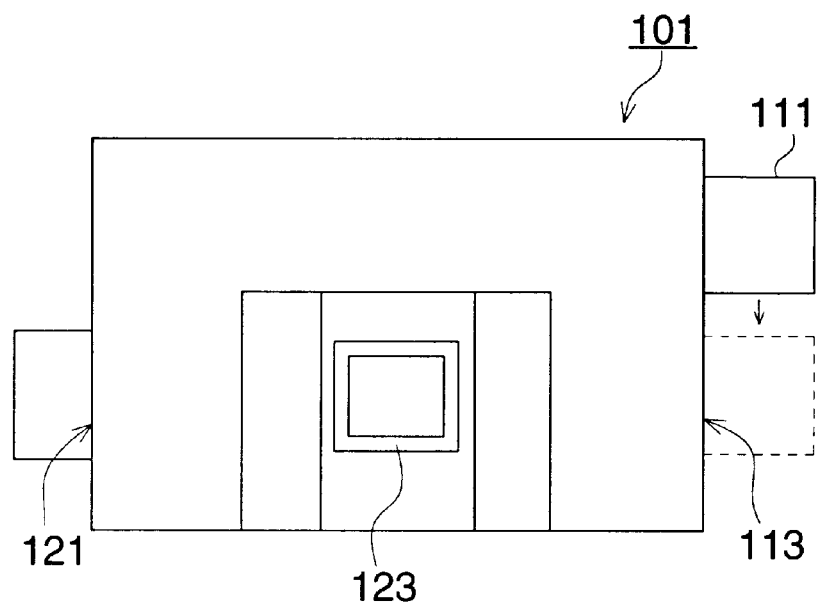
FIG. 15 (*a*) is an illustrative diagram showing the external front side of a film carrier in Embodiment 2—2.
Figure 15:
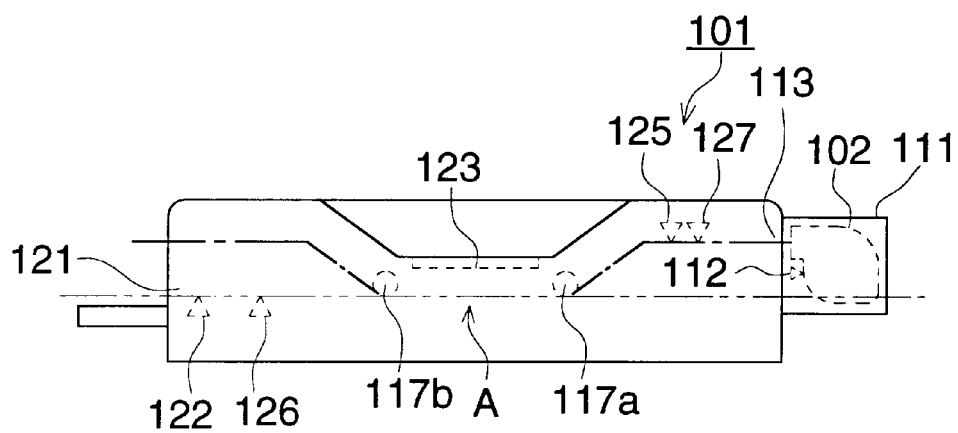

Next, Embodiment 2—2 will be explained based on FIG. 15 representing illustrations for the front view and the top view of an appearance of film carrier 1. In Embodiment 2-1, the first conveyance path is provided under the second conveyance path, but in the present embodiment, the first conveyance path is provided over the second conveyance path. Incidentally, with regard to details (concrete structures) of the inside of the film carrier 101 in the present embodiment, they may be structured by modifying the above-mentioned first embodiment properly. Therefore, illustration and explanation therefor will be omitted in the present embodiment. In the following explanation, items which are given the same numbers as those in the above-mentioned Embodiment 2-1 are assumed to have the same structure, operation and function as those in Embodiment 2-1 (in this case, even an illustration is sometimes omitted).

In the present embodiment, the first conveyance path (one-dot chain lines) for an IX 240 type film is provided over the second conveyance path (two-dot chain lines). Since the IX 240 type film is handled solidly with cartridge 102 as stated above, when the first conveyance path is simply provided over the second conveyance path, holding section 111 which holds the cartridge 102 affects conveyance of a 135 type film adversely. On the other hand, when the first conveyance path is provided to be high enough above the second conveyance path so as not to be affected adversely, the IX 240 type film conveyed through the first conveyance path is required to change its course sharply toward the common path, which impedes stable conveyance. Therefore, the holding section 111 is provided in a way that it can retreat to the position where conveyance of a 135 type film is not impeded. Namely, in the present embodiment, the holding section 111 is provided to be capable of sliding between the retreat position (shown with solid lines in FIG. 15 (*a*)) where the conveyance of a 135 type film is not impeded and the conveyance position (shown with broken lines in FIG. 15 (*a*)) where an IX 240 type film is conveyed. Owing to this structure, it is possible to make the first conveyance path and the second conveyance path to be closed to each other, and thereby to make the smooth conveyance possible without changing the conveyance direction for a negative film sharply when it is guided to the common path.

Though the holding section 111 is structured to slide in the present embodiment, it may also be structured to swing properly, without being limited to sliding. Though the first insertion inlet 113 for an IX 240 type film and the second insertion inlet 121 for a 135 type film are arranged to be opposite (right and left in FIG. 15 (*b*)) to each other in the film conveyance direction for easy insertion of a 135 type film in the present embodiment, the first insertion inlet and the second insertion inlet can also be provided on the same side, without being limited to the both sides.

Now, operations of film carrier 101 in the present embodiment will be explained. First, an occasion wherein an IX 240 type film is conveyed will be explained.

Cartridge 102 housing therein an IX 240 type film is loaded in holding section 111. When the first detecting means 112 detects that the cartridge 102 has been held by the holding section 111, the holding section 111 slides automatically to be located at the conveyance position. When a detecting means such as an unillustrated sensor detects that the holding section has been located at the conveyance position, the IX 240 type film is fed out of the cartridge 102 by an unillustrated means, switching means 118 and 119 (not shown but see FIG. 1) are swung so that the IX 240 type film can be conveyed, and a conveyance means (not shown but see FIG. 14) is driven so that the IX 240 type film can be conveyed to the left in FIG. 15 (*b*). The IX 240 type film fed out of the cartridge 102 is conveyed while being regulated in terms of the crosswise direction by an unillustrated guide member, then magnetic information thereon is read by magnetic head 127, and image information and optical information thereon are read by the first sensor 125. Then, the IX 240 type film is further conveyed, and it changes its course toward the common path so that it may be guided by switching means 118, then is nipped by roller 17*b* after passing the position A, and conveyed until the image thereon is positioned on the position A based on information obtained by reading by the first sensor 125 and magnetic head 127. When the image is positioned at the position A, pressure plate 123 comes in pressure contact with the IX 240 type film to keep its flatness, and exposure or reading of the image is conducted.

The IX 240 type film is conveyed intermittently until the subsequent image thereon is located at position A while being regulated in terms of the crosswise direction by an unillustrated guide member, thus, the aforesaid exposure or reading is conducted in succession. After completion of exposure or reading for all images, rollers 114*a*, 115*a*, 116*a*, 117*a* and 117*b* are driven to rotate clockwise in the drawing so that the IX 240 type film is guided into cartridge 102.

Incidentally, there has been explained an occasion here wherein exposure or reading is conducted in the course of moving forth (when the IX 240 type film moves to the left). However, it is also possible to use a method wherein first sensor 125 and magnetic head 127 read information in the course of moving forth, and exposure or reading is conducted in the course of moving back.

On the other hand, when conveying a 135 type film, the 135 type film is inserted in the second insertion inlet 121, and when the second detecting means 122 detects the 135 type film, switching means 118 and 119 are swung so that the 135 type film may be conveyed, and a conveyance means is driven so that the 135 type film may be conveyed toward the right in FIG. 15 (*b*). If the holding section 111 is not present at a retreat position in this case (namely, if the holding section 111 is in the position to impede the conveyance of the 135 type film), an error is displayed, or the holding section 111 is moved automatically to the retreat position. The 135 type film is conveyed while being regulated in terms of the crosswise direction by an unillustrated guide member, and image information and optical information thereon are read by the second sensor 126. Then, it is further conveyed to be guided by switching means 118 and is further conveyed by roller 117*a*. Then, the 135 type film is nipped by roller 176*b* after passing the position A, and conveyed until the image thereon is positioned on the position A based on information obtained by reading by the second sensor 126. When the image is positioned at the position A, pressure plate 123 comes in pressure contact with the 135 type film to keep its flatness, and exposure or reading of the image is conducted. Then the 135 type film is conveyed while being regulated in terms of the crosswise direction by an unillustrated guide member to be ejected out of the film carrier 101. In this case, conveyance of the 135 type film by a conveyance means is driven intermittently so that the aforesaid exposure or reading may be conducted each time the image is positioned at position A.

As stated above, at least a part of the first conveyance path and a part of the second conveyance path are arranged vertically, and path portions of the first and second conveyance paths located at least on the position A are made to be a common path. Therefore, the film position for exposure or reading is the same for both an IX 240 type film and a 135 type film, which makes it unnecessary to change lens 104, a photographic paper or an image sensor. It is further possible to convey both an IX 240 type film and a 135 type film properly despite a difference between them in terms of a length in the crosswise direction of the film, because they are arranged vertically for their conveyance.

Further, in the present embodiment, the second conveyance path is provided to be almost on the same plane as the position A. For the 135 type film handled as a short film strip, therefore, a change in the conveyance path therefore is less, and conveyance can be stabilized. Further, the first conveyance path to convey an IX 240 type film handled solidly with cartridge 102 is arranged over the second conveyance path, and holding section 11 which holds cartridge 102 is provided so that it can retreat to the position where the conveyance of a 135 type film is not impeded. Therefore, it is possible to arrange the first and second conveyance paths to be close to each other, and to control the change of the first conveyance path to be minimum, whereby conveyance can be stabilized.

Though automatic sliding of the holding section 111 has been explained in the present embodiment, manual sliding can also be employed. In this case, it is preferable that the first detecting means 112 is made to be a detecting means which detects that cartridge 102 is loaded in holding section 111 and it is located at the conveyance position.

Effect of Embodiment 2

Embodiment 2 makes it possible to improve work efficiency with less investment by providing a film carrier which can convey different negative films and plural negative films each being different in terms of a length in the crosswise direction without impeding exposure or reading, with at least positions of various conveyance paths for conveying negative films each having a different length in the crosswise direction which are made to be common.

Embodiment 3

In the present embodiment, a film carrier has therein a movable guide member and is structured to be capable of moving in accordance with a film width, so that images on photographic films of plural types each being different in terms of a film width can be subjected to printing exposure.

Embodiment 3-1

Figure 16:
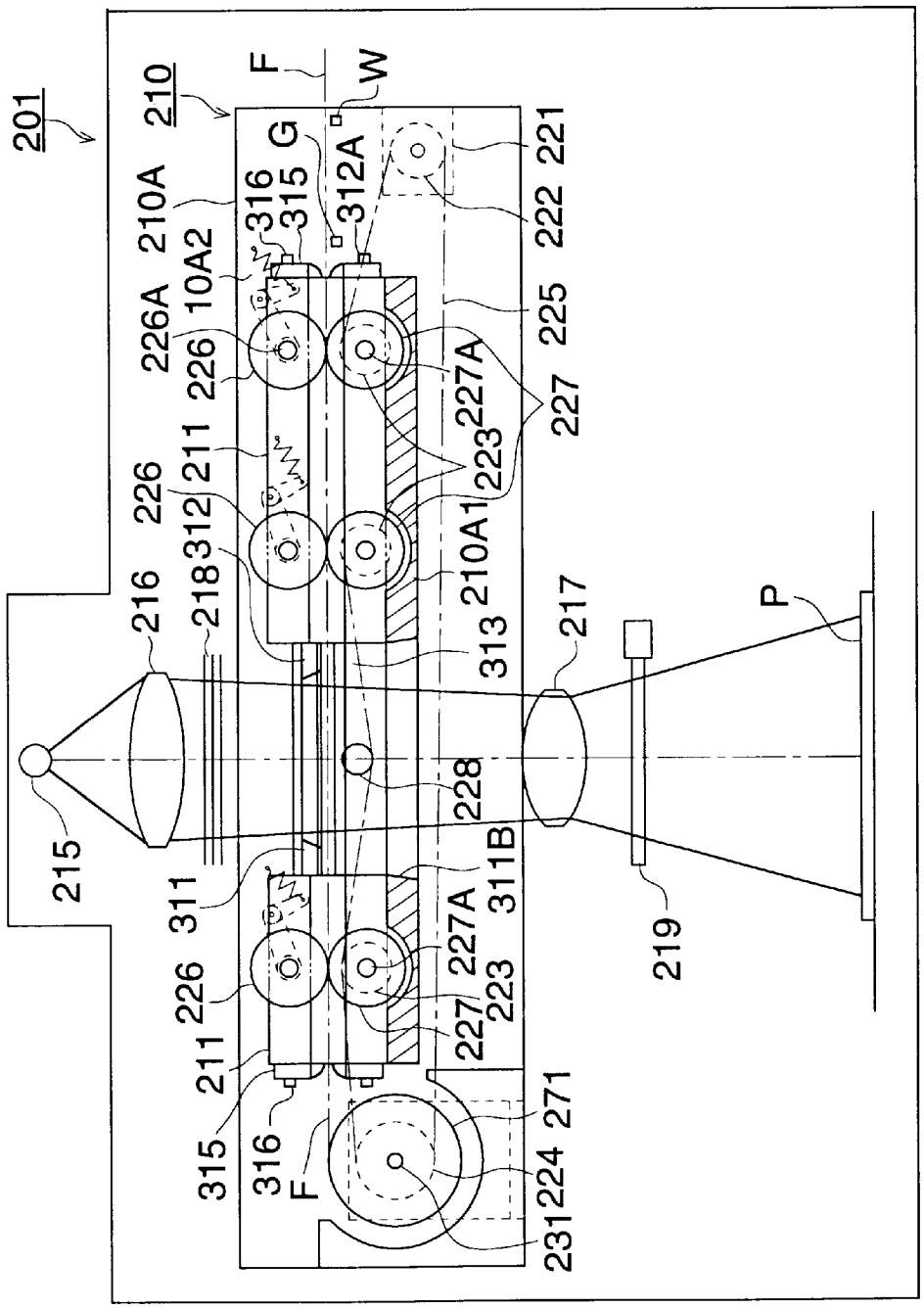
FIG. 16 is a schematic structure diagram of a photographic printing apparatus equipped with a film carrier in Embodiment 3-1.

Prior to explanation of a film carrier in Embodiment 3-1, a schematic structure diagram of a photographic printing apparatus provided with the film carrier in FIG. 16 will be explained.

in FIG. 16, photographic printing apparatus 201 is composed of an illuminating system for films, a film carrier, an exposure section, and a photographic paper holding section. The illuminating system for films is an optical system which illuminates films, and a luminous flux of light source 215 illuminates film F through illuminating lens 216 and correction color filter 218. The film carrier winds up a film and ejects it with one driving source represented by motor 221. The exposure section is structured so that an image on a film is printed on photographic paper P conveyed to the printing position through lens 217 and shutter 219.

In detailed explanation of the film carrier 210 in Embodiment 3-1, the symbol 21A is a base body of a conveyance apparatus, and it is composed of walls 210A2 on both sides and reference plate 210A1 which links the walls together, and film mask 311 of an image plane mask is provided on a part of a conveyance path facing the exposure section. On a film conveying means, motor 221 representing a driving source mounted on the wall 210A2 makes regular turns to convey a film toward a take-up reel, and it further makes reverse turns to convey the film toward the ejecting side from the take-up reel. On the shaft of the motor 221, there is attached pulley 222 about which timing belt 225 is entrained. When the timing belt 225 is driven, other pulleys 223, 228 and 224 supported rotatably on the wall 210A2 are simultaneously rotated. When the pulley 223 is rotated, roller 227 having its shaft 227A and roller 226 having its shaft 226A pressed by the roller 227 are rotated to convey the film. When the pulley 224 is rotated, take-up shaft 231 is rotated. Incidentally, pulley 228 is a tension pulley for the timing belt. On the take-up shaft 231, there is provided take-up reel 271.

Figure 18:
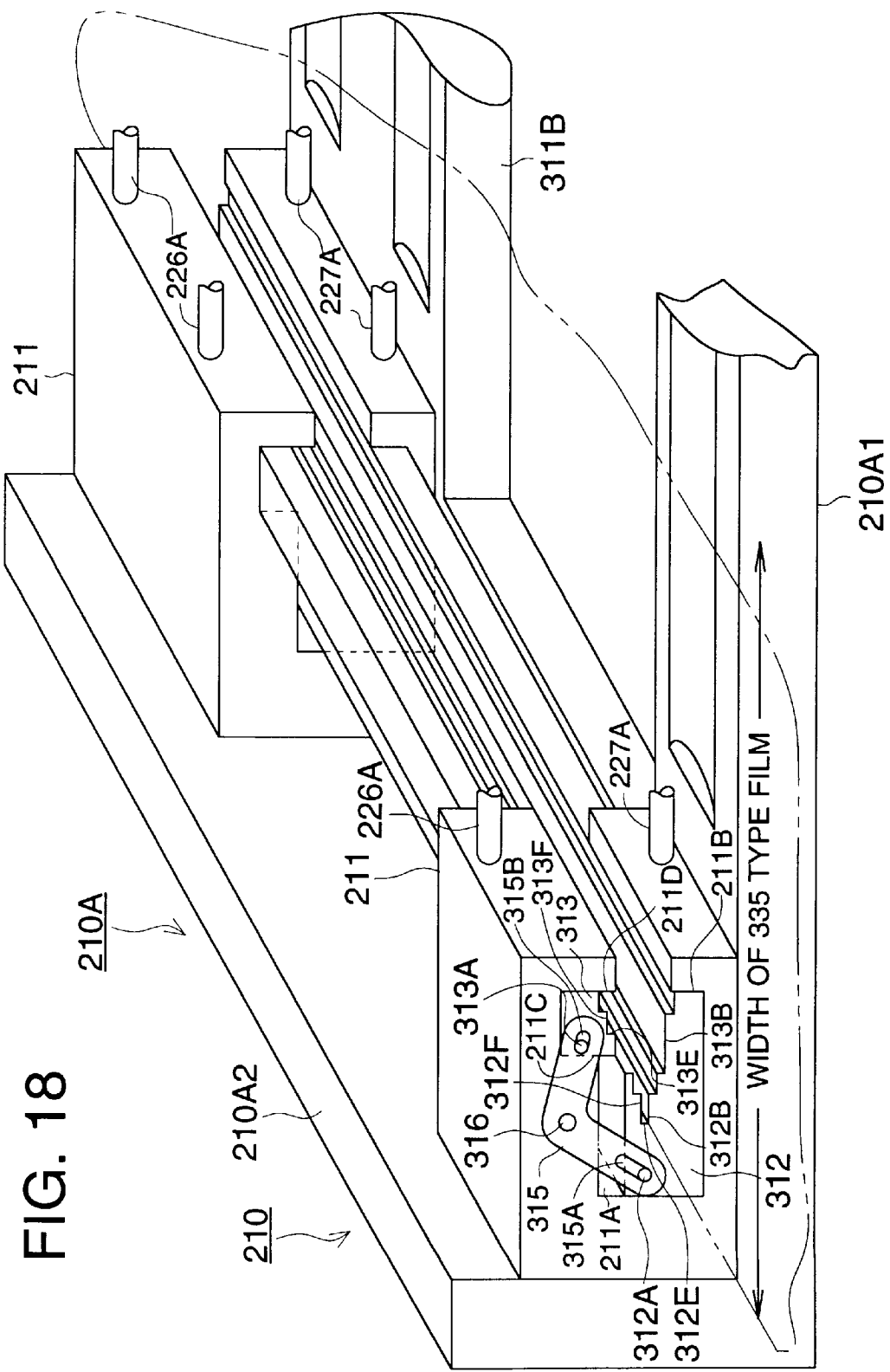
FIG. 18 is a partial perspective view where a conveyance guide of a film carrier provided in FIG. 16 is set for a large size.
Figure 19:
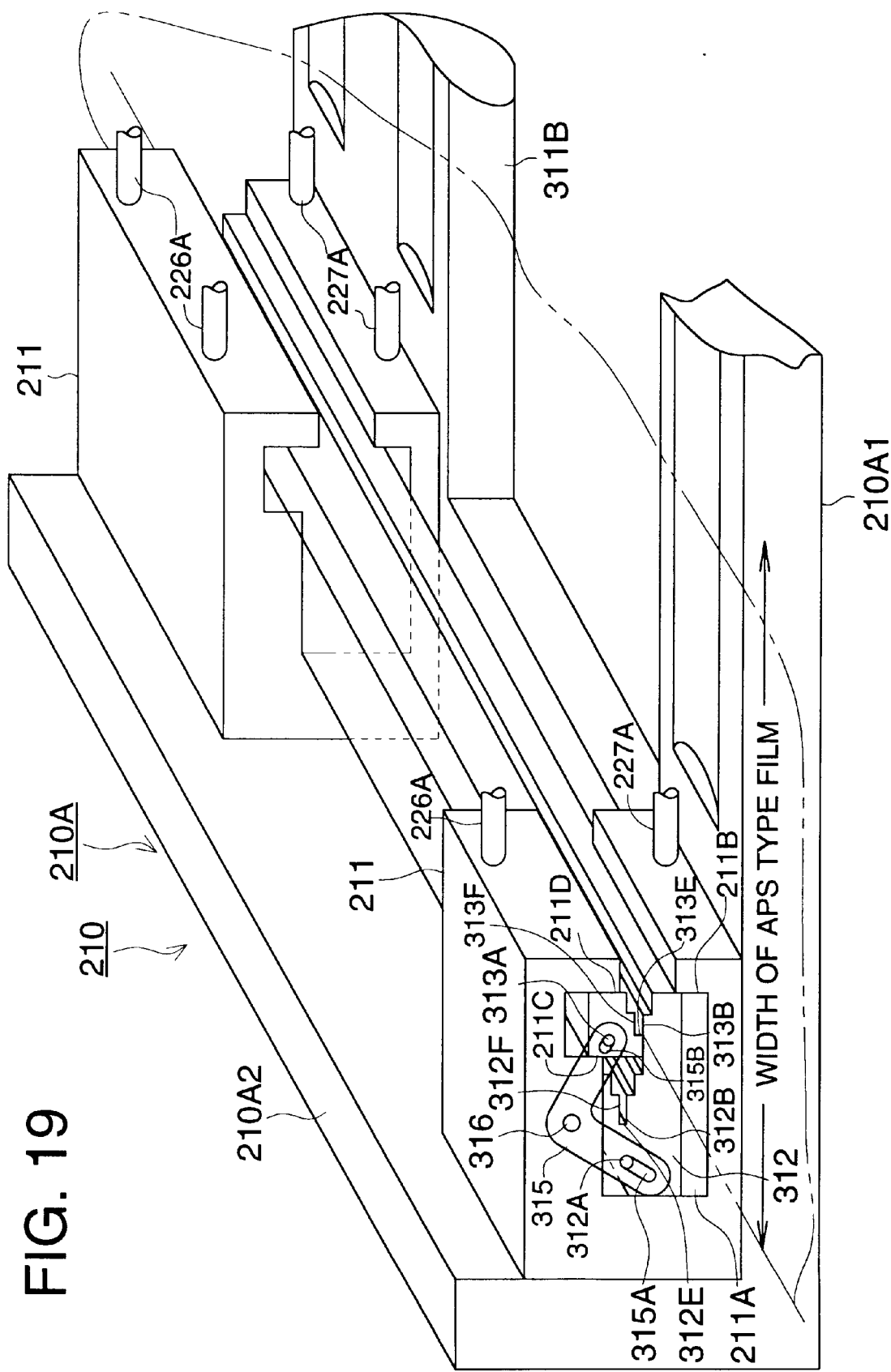
FIG. 19 is a partial perspective view where a conveyance guide of a film carrier provided in FIG. 16 is set for a small size.

Guide frames 211 attached fixedly on reference plate 210A1 of base body 210A of the film carrier 210 are provided on both sides in the film conveyance direction, and first guide member 312 and second guide member 313 are housed in the guide frame 211 as shown in a perspective view in FIG. 18 or FIG. 19. The first guide member 312 is made to be slidable in the direction of the film conveyance plane along inner surfaces 211A and 211B of the guide frame 211, while the second guide member 313 is made to be slidable in the direction of the film conveyance plane along inner surfaces 211C and 211D of the guide frame 211. With regard to the first and second guide members, they are linked together when elongated holes 315A and 315B provided respectively on both ends of lever 315 supported rotatably around supporting shaft 316 studded in the guide frame 211 are engaged respectively with pins 312A and 313A provided respectively on the first and second guide members 312 and 313, and lever 315 is rotated clockwise or counterclockwise by an unillustrated cam. When it is rotated counterclockwise, the first guide member 312 slides along an inner surface of the guide frame 211 in the aforesaid direction of the conveyance plane as shown in a perspective view in FIG. 18, and the second guide member 313 slides in the opposite direction, and a crosswise guiding portion is formed and positioned with the first guide member alone by guide surfaces 312E, 312F and 312B which guide an edge, the surface and the reverse side of an edge portion of a wide film, for example, a 135 type film. When the lever is rotated clockwise, on the contrary, the first guide member 312 is caused by a moving means stated later to slide to leave the film conveyance surface as shown in a perspective in FIG. 19. Due to this, guide surface 313B for the reverse side of a side edge of a narrow film, for example, of APS film is formed, and the second guide member slides toward the film conveyance plane to form guide surfaces 313F and 313E for two sides including the surface and an edge of the side edge portion of a narrow film. It is arranged so that a crosswise guiding portion of a conveyance path for a narrow film, for example, of APS film may be formed and positioned when the first and second guide members 312 and 313 are combined to be in contact with each other. In this case, each guide surface is formed so that the center line in the conveyance direction and a film conveyance plane both for film image planes of two types may be kept the same.

Next, the moving means stated above will be explained.

The aforesaid levers 315 are supported rotatably around supporting shafts 316 fixed on symmetrical positions on both ends in the film conveyance direction on the guide frame 211. Since the rotation thereof is conducted by an unillustrated cam in the same shape, the first and second guide members 312 and 313 can slide smoothly along an inner surface of the guide frame 211.

At the film double-sided position in the intermediate portion between two guide frames 211 at both ends, there is provided passage aperture 311B for exposure light.

Operations of the moving means stated above can also be conducted by a solenoid in place of a cam. However, operations conducted by the cam are more smooth.

Further, switching operations can be conducted by receiving signals of a film width detector W provided in a photographic printing apparatus.

When there is a difference between a film width and a width of a film conveyance guide, a signal value from width detector G for the conveyance guide is compared with a signal value from the detector W, and if the difference is detected, operations such as a buzzer or the like can be conducted as a warning.

The foregoing is an example of the embodiment corresponding to Item 3-1, and there will be explained a first guide member and a second guide member in another example which is structured by replacing guide surfaces of the first and second guide members 312 and 313 each other.

Figure 20:
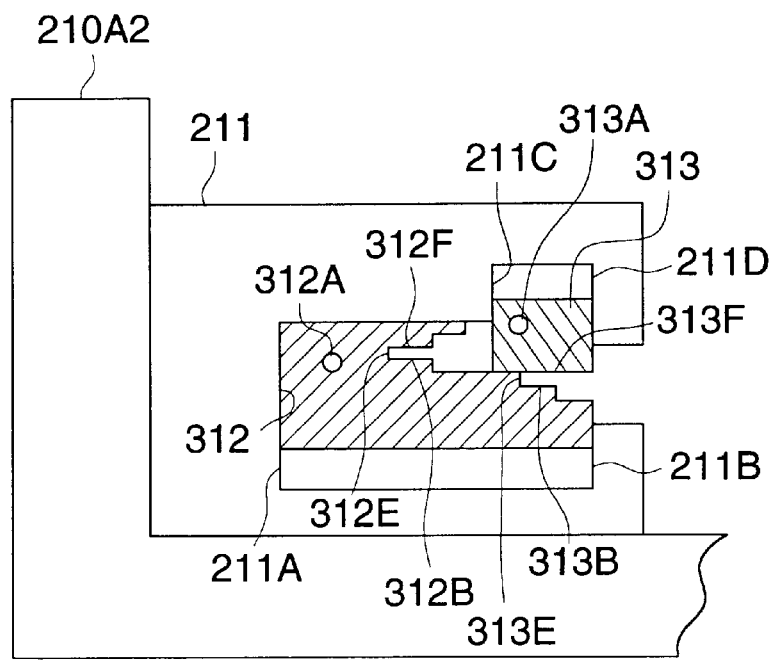
FIG. 20 is a sectional view showing another variation of the first and second guide members.

This is a structure wherein reverse side guide surface 313B and edge guide surface 313E both for a narrow film are provided on the first guide member 312, and obverse guide surface 313F only is provided on the second guide member 313 as shown in a sectional view in FIG. 20. When guiding a narrow film, a crosswise guiding portion with guide surfaces in three directions 313E, 313B and 313F is formed by a combination of the first and second guide members as in the embodiment stated above, and the effect which is mostly the same as that in the aforesaid embodiment can be obtained.

Figure 21:
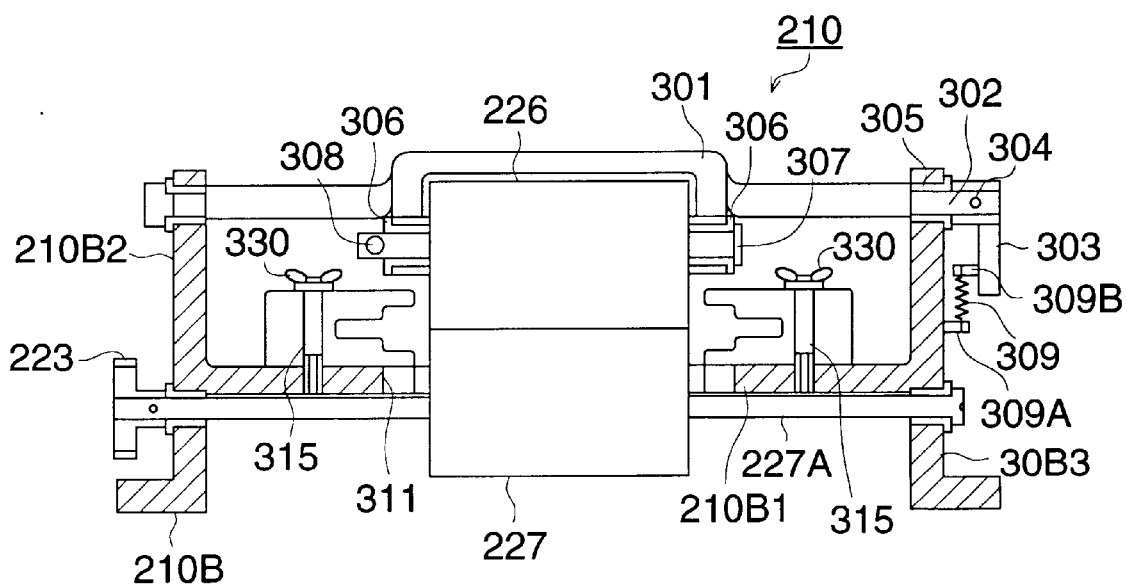
FIG. 21 is a sectional view taken on line A—A of a film carrier provided in FIG. 17.

Embodiment 3-1 is an example of a film carrier wherein conveyance paths for films having two different widths are made to be switchable, but when making the conveyance paths for films having three different widths to be switchable, another mechanism must be used. This is the structure corresponding to Item 3-2, and its Embodiment 3-2 will be explained with reference to a schematic structure diagram of a photographic printing apparatus in FIG. 17 and to A—A section of the portion of its film carrier shown in FIG. 21.

Figure 17:
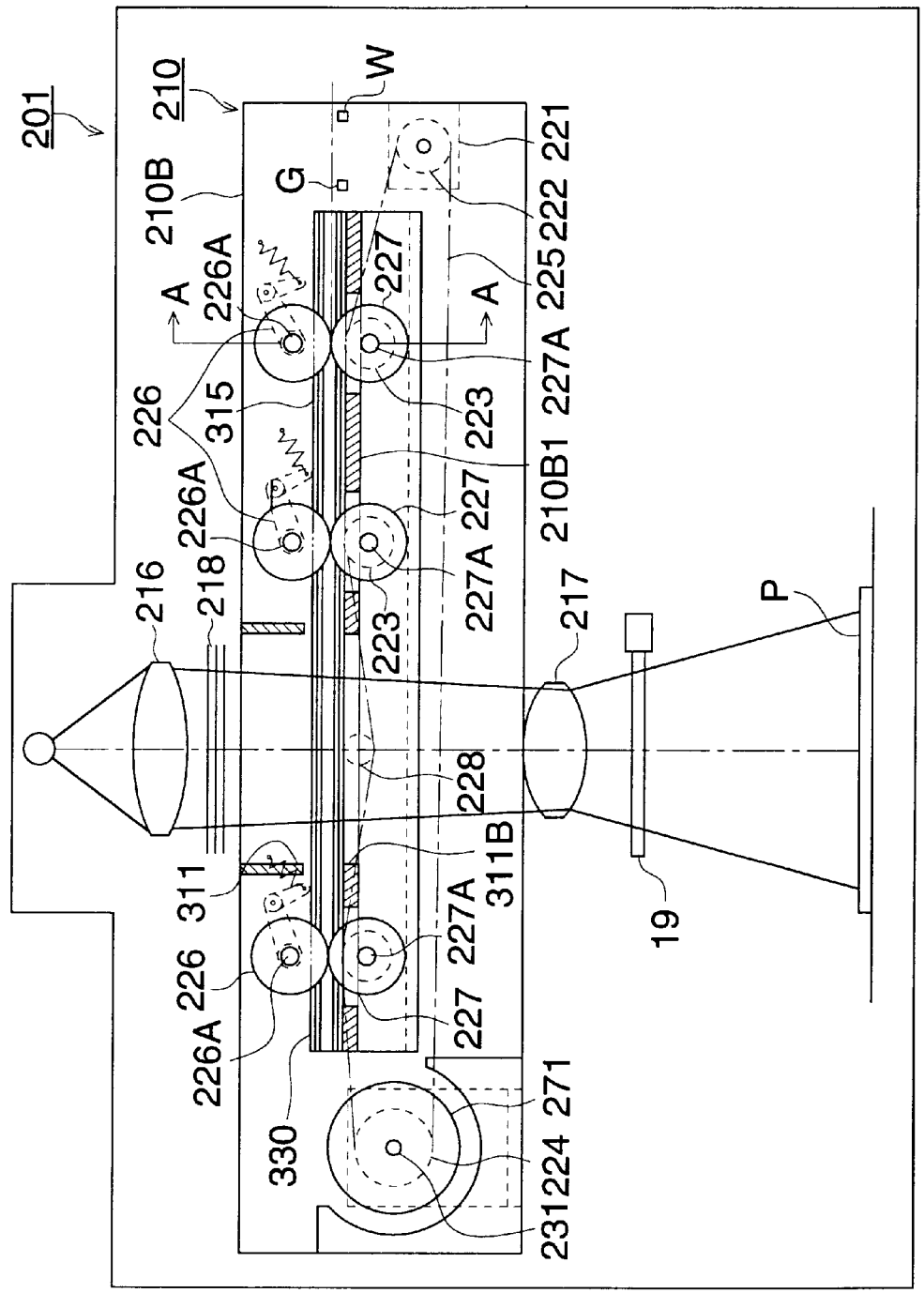
FIG. 17 is a schematic structure diagram of a photographic printing apparatus equipped with a film carrier in Embodiment 3-2.

In FIG. 17, explanation of common portions such as optical system portions which are common with those in FIG. 16 will be omitted. Namely, film carrier 10 is not provided with guide frame 211, which is different from the occasion in FIG. 16, but a conveyance guide is slid in the crosswise direction in base body 210B to be set. The base body 10B forms a frame wherein the rear side and walls 210B2 and 210B3 on this side are connected by reference plate 210B1, and guide surfaces 314E, 314F and 314B wherein film guide member 314 guides an edge, an obverse side and a reverse side of a film side portion as a film guide to symmetrical positions about the center line of the film conveyance path, are formed solidly as a crosswise guiding portion. The film guide member 314 moves on the reference plate 210B1 in the crosswise direction in accordance with a width of a film to be used, and is fixed at the position where the film conveyance is correctly regulated and guided on the reference plate 210B1 by a wing nut, for example. In this case, the center line in the conveyance direction of a film image plane and a film conveyance plane are set to be kept to be the same.

With regard to roller 227 for film conveyance driving, shaft 227A, which is concentric and solid with the roller 227, is supported rotatably by bearings provided on both walls 210B2 and 210B3 of base body 210B, and driving wheel 223 is attached on one end of the shaft, and the wheel 223 is rotated correctly by timing belt 225 employing the same power transmission mechanism as in the structure explained in FIG. 10.

For the roller 227 for film conveyance driving, driven roller 226 is supported rotatably by bearing 306, which is provided on swing frame 301, and shaft 302, which is provided to be concentric on both sides of the swing frame 301 and is in parallel with the roller 226, is supported rotatably by bearings 305 on both walls 210B2 and 210B3 of the base body 210B. On one end of the shaft 302, lever 303 is fixed by pin 304, for example, and spring 309 is hooked between spring peg pin 309B provided on the lever and spring peg pin 309A provided on wall 210B3, thereby both rollers are brought into pressure contact with each other to generate conveyance force for films.

The foregoing is an example of a mechanism to bring roller 226 into pressure contact with roller 227, and this can be applied commonly to FIG. 16 and FIG. 17.

Whether the film width agrees correctly with positions of the set conveyance guides or not is checked by comparison of detection signals between detector W and detector G, which is the same as that in FIG. 16, and when they are different, operations such as a buzzer can be conducted as a warning.

Effect of Embodiment 3

Owing to the film carrier of the invention, conveyance guides for plural films of two or more types each having a different width can be changed in a short period of time in a simple and sure way, and it has become possible to reduce manufacturing cost of an apparatus sharply, compared with a method to change as a unit wherein most of mechanisms for conveyance guides are combined, as in the past.

Incidentally, a printing apparatus of the invention is not limited only to the combination of a 135 type film and an IX 240 type film, and a negative film is not the only subject handled by the printing apparatus.

It is further possible to realize the structure to conduct printing from films of three types using a carrier having three lanes each having a different size.

Further, a light-sensitive material is not limited to a photographic paper, but a light-sensitive film and an electronic image pick-up device (CCD, BBD, image pick-up tube etc.) can also be used. When using CCD, image receiving signals obtained by CCD are used to detect the film inserted in the lane, and these detection signals are used for switching of light sources, switching of optical paths, switching of lane positions, transmission of detection signals and switching and control of film conveyance driving means.

What is claimed is:

1. An image recording apparatus comprising:
   a film loading section on which a first film or a second film having a width which differs from that of the first film can be loaded;
   a printing section distant from the film loading section;
   detecting means for detecting a film width of the loaded film on the film loading section and for outputting detection signals;
   conveyance means for conveying said loaded film from the film loading section to the printing section;
   conveyance control means for controlling said conveyance means in accordance with said detection signals; and
   a light source to irradiate the loaded film at the printing section, thereby projecting light corresponding to an image formed on the loaded film onto a light-sensitive material.

2. The image recording apparatus according to claim 1, wherein said conveyance control means conducts the controlling in the widthwise direction of the loaded film.

3. The image recording apparatus according to claim 1, wherein said conveyance means has a film carrier including at least two lanes each having an opening, and said conveyance control means selects at least one lane out of said at least two lanes.

4. The image recording apparatus according to claim 3, wherein said conveyance control means selects said lane corresponding to the width of said loaded film in accordance with said detection signals.

5. The image recording apparatus according to claim 4, wherein said film carrier is provided to be capable of moving in an optical path of said light source.

6. The image recording apparatus according to claim 5, wherein said conveyance control means moves said lane corresponding to the width of said film in an optical path of said light source in accordance with said detection signals.

7. The image recording apparatus according to claim 5, wherein a film carrier detecting means which detects a type of a film carrier positioned in said optical path, and a warning means which gives a warning when the type of said film carrier detected by said film carrier detecting means is different from the type of said film conveyed by said conveyance means.

8. The image recording apparatus according to claim 3, comprising:

an optical system having therein a mirror and a projecting lens both for projecting an image formed on the film positioned at said printing section onto said light-sensitive material;

a state detecting means which detects the state of said optical system and outputs state detection signals; and an optical path switching means which switches said optical path in accordance with said sign detection signal and said state detection signal.

9. The image recording apparatus according to claim 8, further comprising a light-shielding means provided between said film carrier and said projecting lens, wherein said light-shielding means shields light against an opening on said lane when no film passes through said printing section.

10. The image recording apparatus according to claim 3, wherein a warning and/or an indication is given when a combination of a size of said film to be printed based on said detection signal and a size of a light-sensitive material set is different from a predetermined combination for printing with a given magnification established in advance.

11. The image recording apparatus according to claim 3, wherein said conveyance control means controls said conveyance means so that said film is conveyed only when said film to be printed is present on the lane which is in the printing section.

12. The image recording apparatus according to claim 3, wherein, when a film to be printed is inserted in another lane on said film carrier which is out of the printing section, said conveyance control means makes said film carrier to move automatically to position said film on the printing section for printing.

13. The image recording apparatus according to claim 3, wherein, when a film inserted in a lane on one side is printed and when another film is inserted in a lane on the other side, at least one of a warning, an indication, an interruption of conveyance of said another film, and ejection of said another film from the lane by reverse conveyance is executed.

14. The image recording apparatus according to claim 3, wherein, said film is a photographic film on which a plurality of frame images are recorded to be arranged in the lengthwise direction, each of said first lane and second lane has, when it is set at said printing section, a mask which is located at the printing section, and said conveyance control means controls said conveyance means so that said frame images are positioned at the mask in succession by conveying said photographic film in accordance with the lane located at the printing section.

15. The image recording apparatus according to claim 3, further comprising:

a printing lens which conducts printing exposure from said film in the lane arranged at said printing section on said light-sensitive material; and a magnification control means which determines the printing magnification in accordance with the lane arranged at said printing section.

16. The image recording apparatus according to claim 3, wherein the first establishment of the size of a light-sensitive material for print use subjected to printing exposure from a photographic film in the lane arranged at said printing position when a lane is switched is made to be represented by the size of the light-sensitive material for print use determined in the preceding cycle in the lane arranged at the printing position.

17. The image recording apparatus according to claim 3, wherein a reading sensor which detects information recorded on a photographic film is provided on each of said first lane and second lane, a switching means to switch so that detection signals of the reading sensor on the lane arranged at said printing position may be transmitted to the reading means is provided, and a reading means which reads information recorded on said photographic film from detection signals of said reading sensor transmitted by said switching means is provided.

18. The image recording apparatus according to claim 3, wherein an insertion detecting sensor which detects that a photographic film has been inserted is provided at each entrance of said first and second lanes, and a means to cause said carrier to move automatically based on the results of detection made by said insertion detecting sensor and to switch said first and second lanes to arrange at the prescribed printing position is provided.

19. The image recording apparatus according to claim 1, wherein said conveyance means has at least two film conveyance paths, and said conveyance control means selects at least one of said at least two film conveyance paths in accordance with said detection signals.

20. The image recording apparatus according to claim 19, wherein said at least two film conveyance paths are partly arranged at different levels so as to form different paths and are partly arranged at the same level so as to form a common path.

21. The image recording apparatus according to claim 20, wherein said at least two film conveyance paths have guide members corresponding respectively to widths of the first and second films.

22. The image recording apparatus according to claim 20, wherein two film insertion inlets corresponding respectively to said at least two film conveyance paths are provided, and said two film insertion inlets are arranged at the different levels respectively.

23. The image recording apparatus according to claim 1, wherein said conveyance means has a film carrier in which at least one lane is included and a size of the lane in the film width direction can be changed, and said conveyance control means changes a size of the lane in the film width direction in accordance with the detection signals.

24. The image recording apparatus according to claim 1, wherein film conveyance guides which correspond to two types of films each being different in terms of a width and are switched in terms of position with the conveyance direction center line of a film image plane and a film conveyance plane both kept to be the same, to comply with a film width of either one of the two types of films, are provided on both sides of the conveyance direction center line, and the conveyance guides are composed of a first guide member which corresponds to the first film width and has guide surfaces guiding three directions of an obverse side, a reverse side and an edge of the film side edge section and a second guide member which corresponds to the second film width and has guide surfaces which guide an obverse surface and an edge or only an obverse surface of the film side edge section, and the first guide member and the second guide member are housed slidably in a guide frame provided on the base body of a film conveyance apparatus, and they move in the direction perpendicular to the film conveyance plane and in the reverse direction each other through a moving means to be switched to the position to guide in three directions of either one of two types of films.

25. The image recording apparatus according to claim 24, wherein there is provided a warning means which gives a warning when said film width does not agree with a width of the conveyance guide.

26. The image recording apparatus according to claim 1, wherein film conveyance guides which correspond to plural films each being different in terms of a width and are switched in terms of position with the conveyance direction center line of a film image plane and a film conveyance plane both kept to be the same, to comply with a film width of either one of the two types of films, are provided on both sides of the conveyance direction center line, and the conveyance guides are composed of a guide member which corresponds to each film width, and has guide surfaces to guide three directions of an obverse side, a reverse side and an edge of the film side edge portion, and can slide on the reference plate of the base body of a film conveyance apparatus in parallel with the film conveyance plane, and said guide member slides to the position to guide in three directions corresponding to each prescribed film to be positioned and set on the reference plate.

27. The image recording apparatus according to claim 24, wherein there is provided a warning means which gives a warning when said film width does not agree with a width of the conveyance guide.

28. The image recording apparatus according to claim 3, wherein CCD is used as the aforesaid light-sensitive material.

29. The image recording apparatus according to claim 29, wherein output from the CCD is used for switching lanes.

30. A film carrier for use in an image forming apparatus in which the film carrier is provided between a light source and an image forming surface, comprising:

a diaphragm for being located between the light source, and the image forming surface, the diaphragm provided with an aperture defining an optical path through which light is projected from the light source to the image forming surface;

a film loading section on which a first film or a second film having a width which differs from that of the first film can be loaded;

detecting means for detecting a film width or a related information of the first film and the second film and for outputting detection signals indicating which one of the first film and the second film is loaded on the film loading section; and conveyance means for conveying said films from the film loading section to the aperture on the diaphragm along a conveyance path having a width, said conveyance means adapted to change the width of the conveyance path in accordance with said detection signals.

31. The film carrier of claim 30, wherein said conveyance means comprises a plurality of lanes each having a different width from others and one of said plurality of lanes is selectively used as said conveyance path in accordance with said detection signals.

32. The film carrier of claim 30, wherein said conveying means comprises a width changing member to change the width of the conveyance path and said width changing member is controlled so as to change the width of the conveyance path in accordance with said detection signals.

* * * * *